(12) United States Patent
Vernon et al.

(10) Patent No.: US 8,484,710 B2
(45) Date of Patent: Jul. 9, 2013

(54) SYSTEM AND METHOD FOR SECURELY SENDING A NETWORK ONE-TIME-PASSWORD UTILIZING A MOBILE COMPUTING DEVICE

(75) Inventors: Jim Vernon, Carrollton, TX (US); Steven W. Smith, Denton, TX (US)

(73) Assignee: Pass Protect Technology, LLC, Richardson, TX (US)

( * ) Notice: Subject to any disclaimer, the term of this patent is extended or adjusted under 35 U.S.C. 154(b) by 133 days.

(21) Appl. No.: 13/199,797

(22) Filed: Sep. 9, 2011

(65) Prior Publication Data

US 2011/0321146 A1 Dec. 29, 2011

Related U.S. Application Data

(63) Continuation-in-part of application No. 12/218,009, filed on Jul. 10, 2008, now Pat. No. 8,020,199, which is a continuation-in-part of application No. 11/607,764, filed on Dec. 1, 2006, now Pat. No. 7,502,936, which is a continuation-in-part of application No. 11/061,223, filed on Feb. 18, 2005, now Pat. No. 7,581,113, which is a continuation-in-part of application No. 09/783,049, filed on Feb. 14, 2001, now Pat. No. 7,043,640.

(51) Int. Cl.
*H04L 29/06* (2006.01)
*G06F 15/16* (2006.01)

(52) U.S. Cl.
USPC .......................................................... 726/7

(58) Field of Classification Search
USPC .......................................................... 726/7
See application file for complete search history.

(56) References Cited

U.S. PATENT DOCUMENTS

| | | | | |
|---|---|---|---|---|
| 5,657,388 A * | 8/1997 | Weiss | | 713/185 |
| 5,841,866 A * | 11/1998 | Bruwer et al. | | 705/66 |
| 6,141,760 A * | 10/2000 | Abadi et al. | | 726/14 |
| 7,149,895 B1 * | 12/2006 | Asokan et al. | | 713/159 |
| 2003/0101339 A1 * | 5/2003 | Bianchini et al. | | 713/153 |
| 2006/0143453 A1 * | 6/2006 | Imamoto et al. | | 713/169 |
| 2008/0172713 A1 * | 7/2008 | Kamendje et al. | | 726/1 |
| 2008/0263362 A1 * | 10/2008 | Chen | | 713/184 |
| 2008/0301791 A1 | 12/2008 | Smith et al. | | |
| 2009/0193264 A1 * | 7/2009 | Fedronic et al. | | 713/184 |
| 2011/0208964 A1 * | 8/2011 | Sama | | 713/168 |

OTHER PUBLICATIONS

Franks, J. et al. "HTTP Authentication: Basic and Digest Access Authentication", Jun. 1999.*
Haller, N. et al. "A One-Time Password System" (RFC 2289), Feb. 1998.*
RSA Security Inc. "RSA SecurID Two-factor Authentication", 2010.*

* cited by examiner

*Primary Examiner* — Michael Simitoski
(74) *Attorney, Agent, or Firm* — Steven W. Smith

(57) ABSTRACT

An apparatus, method, and computer program for securely sending a network one-time-password (OTP) from a user computer to an authentication server. A Network Client Application in the user computer interfaces with the authentication server, and a Mobile Server Application in the user computer interfaces with a Mobile Client Application in a mobile computing device (MCD) such as a smartphone. When a user enters a User ID and password into the user computer, the Network Client Application sends the User ID to the authentication server to obtain an index value (Index-1) from the authentication server. The Mobile Server Application authenticates the MCD and then sends Index-1 to the MCD to obtain a network OTP second factor from the MCD. The Network Client Application modifies the user password in accordance with the network OTP second factor to create the network OTP, and sends the network OTP to the authentication server.

20 Claims, 20 Drawing Sheets

SYSTEM AND METHOD FOR SECURELY SENDING A NETWORK ONE-TIME-PASSWORD UTILIZING A MOBILE COMPUTING DEVICE

CROSS-REFERENCE TO RELATED APPLICATIONS

This application is a continuation-in-part of U.S. patent application Ser. No. 12/218,009 filed Jul. 10, 2008, now U.S. Pat. No. 8,020,199, which is a continuation-in-part of U.S. patent application Ser. No. 11/607,764 filed Dec. 1, 2006, now U.S. Pat. No. 7,502,936, which is a continuation-in-part of U.S. patent application Ser. No. 11/061,223 filed Feb. 18, 2005, now U.S. Pat. No. 7,581,113, which is a continuation-in-part of U.S. patent application Ser. No. 09/783,049 filed Feb. 14, 2001, now U.S. Pat. No. 7,043,640, the entire disclosures of which are incorporated by reference herein.

TECHNICAL FIELD

The present invention is directed, in general, to computer security systems. More particularly, and not by way of limitation, the present invention is directed to a system and method for securely sending a network one-time-password (OTP) utilizing a mobile computing device.

BACKGROUND

Computers and networks are often protected by passwords. In order to gain access to the computer or network, a user must enter a password. The computer or network controller (server) authenticates the password by comparing the password entered by the user with a stored password. If the entered password matches the stored password, the user is given access. If not, the user is denied access.

A major problem with password-protected computer systems is the already large and growing threat from "hackers." The popular definition of a hacker refers to individuals who gain unauthorized access to computer systems for the purpose of stealing and/or corrupting data. Hackers are known for breaking into supposedly secure computer systems and damaging web sites, credit card accounts, internal databases, and the like.

Hacker software tools include programs that try many combinations of numbers and letters over a set period of time in an attempt to compromise a password-protected system. On some computer operating systems, as each letter or number is presented by the hacker, the letter or number is confirmed by the system as being correct or incorrect. This serial confirmation sequence actually makes it easier for a hacker to gain entry because fewer combinations of letters and numbers have to be tried. On other operating systems, the password must be completely entered correctly before confirmation is supplied by the system. This may slow down the password discovery process, but with time, the hacker can eventually present a correct password to the target computer system.

A passive hacker may monitor communications between a client device and an authentication server to learn the user's password. The passive hacker may then use the learned password to gain access to the server at a later time. For this reason, many organizations have their users periodically change their passwords. This is a great inconvenience for the users. To defeat the passive hacker, solutions have been tried which change the password for each access. Each time the user logs on, the user types his personal password plus a six-digit number which changes for every logon attempt. Once again, this is a great inconvenience for the user.

An active hacker may actually intercept and alter data packets sent from the client device to the authentication server, preventing the original packets from arriving at the server. The active hacker may then alter the data contents of the packets or may alter address information, thereby posing as the authorized user. The above solution of adding a changing six-digit number to the user's personal password does not defeat this type of active hacker if the hacker can access the server while the changing number is still valid.

In another type of active hacking, the hacker intercepts and alters the destination address of the client's data packets to a fake website which simulates the website the user was trying to reach. For example, the hacker may reroute a user to a fake website which is set up to appear as the user's bank. In an alternative form of this technique, known as phishing, the hacker sends an e-mail to the user posing as his bank's security department and asks the user to click on a link to verify his account information. The link takes the user to a fake site where the user is asked to enter his password and his account number. The hacker then uses this information to access the user's account at his bank.

In yet another type of hacking, the hacker may install a program known as a Trojan on the user's computer. The Trojan may search for data files on the user's computer and transmit them over a network connection to the hacker. Alternatively, a program known as a "key-logging program" may monitor the user's keyboard and capture the keystrokes as the user enters his User ID and password. The Trojan then reports the User ID and password to the hacker who uses it to gain access to the user's protected information.

A solution for countering all of the above hacker threats has been described in U.S. Pat. Nos. 7,581,113; 7,555,655; 7,600,128; 7,5797,251; 7,907,542; and U.S. patent application Ser. No. 12/218,009; all co-owned by the assignee of the instant application. In those patents, a USB plug-in device is inserted into a USB port on the user's computer and is utilized to securely store a database of second factors that are added to, or otherwise used to modify, password characters entered into the computer by a user.

SUMMARY

Although the USB-plug-in device is an extremely secure way to store the second-factor database, there are some users who would prefer not to carry a USB plug-in device. The present invention provides a solution that still defeats all known hacker threats, while eliminating the USB plug-in device. In an exemplary embodiment, the second-factor database is stored in a memory in a mobile computing device (MCD) such as a smartphone, Personal Digital Assistant (PDA), notebook computer, or the like. The MCD interfaces with the user's computer through a novel dialog process and provides a two-factor password to the user's computer during the logon process.

In one embodiment, the present invention is directed to a computer-implemented method of securely sending a network one-time-password (OTP) from a user computer to an authentication server. The method includes the steps of receiving through a user interface, a user password comprising a plurality of characters; authenticating by the user computer, a mobile computing device (MCD) communicably coupled to the user computer, wherein the authenticating step verifies that the MCD can properly construct and return to the user computer, a mobile OTP based on information provided by the user computer; receiving by the user computer, a network OTP second factor from the authenticated MCD; modifying by the user computer, the user password received through the user interface in accordance with the network OTP second factor to create the network OTP; and sending the network OTP from the user computer to the authentication server.

In another embodiment, the present invention is directed to a computer-implemented method of authenticating an MCD by a user computer communicably coupled to the MCD, wherein the MCD includes a mobile client application and the user computer includes a mobile server application. The method includes the steps of the mobile server application receiving from the mobile client application, an identifier of the MCD; the mobile server application utilizing the identifier to look up an MCD index value (Index-2) in an identifier/Index-2 database in the user computer; the mobile server application sending the Index-2 value to the mobile client application; the mobile server application receiving a mobile one-time-password (OTP) from the mobile client application, wherein the mobile client application constructs the mobile OTP based on the MCD identifier and a mobile OTP second factor retrieved from an Index-2/mobile OTP second factor database; and the mobile server application authenticating the MCD when the mobile OTP matches a stored mobile OTP in the user computer.

In another embodiment, the present invention is directed to an apparatus in a user computer for securely sending a network one-time-password (OTP) to an authentication server. The apparatus includes a processor and a non-transitory memory coupled to the processor for storing computer program instructions. When the processor executes the computer program instructions, the processor causes the apparatus to receive through a user interface, a user password comprising a plurality of characters; authenticate an MCD communicably coupled to the user computer; receive a network OTP second factor from the authenticated MCD; modify the user password received through the user interface in accordance with the network OTP second factor to create the network OTP; and send the network OTP to the authentication server.

In another embodiment, the present invention is directed to an apparatus in an MCD for securely sending a network OTP second factor to a user computer communicably coupled to the MCD. The apparatus includes a processor and a non-transitory memory coupled to the processor for storing computer program instructions. When the processor executes the computer program instructions, the processor causes the apparatus to receive from the user computer, an Index-1 value; utilize the Index-1 value to retrieve the network OTP second factor from an Index-1/network OTP second factor database in the MCD; and send the network OTP second factor to the user computer.

In another embodiment, the present invention is directed to a computer program loaded on a non-transitory memory coupled to a processor of a user computer, wherein the program includes a mobile server application and a network client application, wherein when the applications are run on the processor, the processor causes the user computer to securely send a network OTP to an authentication server by performing the following steps: the network client application receiving through a user interface, a User ID and a user password comprising a plurality of characters; the network client application sending only the User ID to the authentication server; the network client application receiving from the authentication server, a first index value (Index-1), and passing the Index-1 to the mobile server application; the mobile server application sending the Index-1 to a mobile client application on an MCD communicably coupled to the user computer; the mobile server application receiving from the mobile client application, a network OTP second factor associated with the Index-1, and passing the network OTP second factor to the network client application; the network client application modifying the user password received through the user interface in accordance with the network OTP second factor to create the network OTP; and the network client application sending the network OTP to the authentication server.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF EMBODIMENTS

The present invention is an improved system and method for generating and authenticating a password to protect a computer system from unauthorized access. In the description herein, the computer system is described as a financial authorization network for exemplary purposes only. It should be understood that the invention is applicable to all types of password-protected computer systems.

Figure 1:
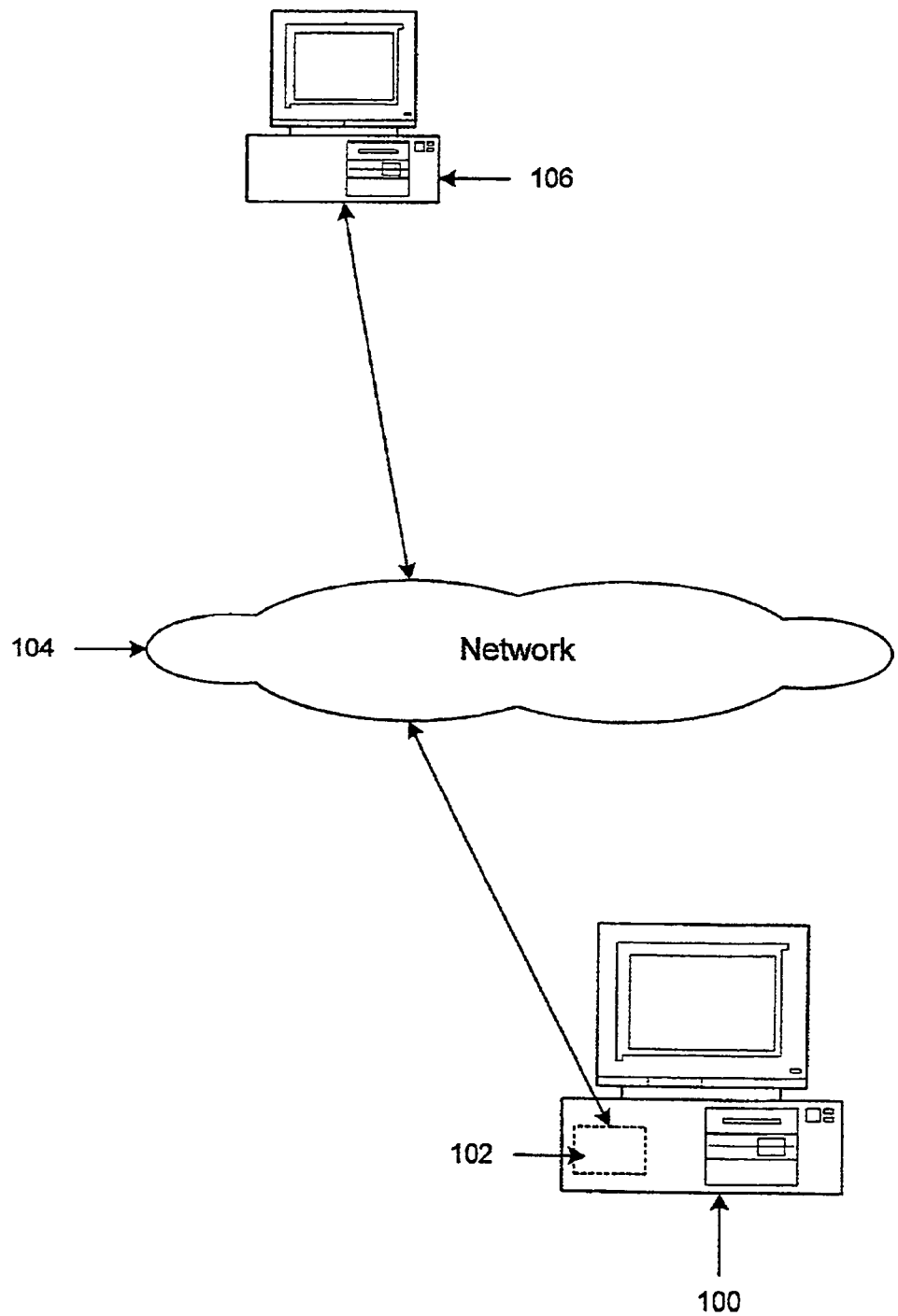
FIG. 1 is a high-level block diagram of an exemplary computer network system.

FIG. 1 depicts a high-level block diagram of an exemplary computer network system. Computer 100 contains a password protection system of the present invention. The present invention comprises executable computer program instructions in a computer program that may be installed in computer 100 to monitor incoming signals and data from computer network 104. A detection portion of the executable program instructions monitors and compares incoming signals with a stored series of predetermined signals. The detection portion of the executable program instructions may comprise a "terminate and stay resident" (TSR) program. The predetermined signals may represent letters, numbers, sounds, or any signals that are readable by a computer. A password builder portion of the executable computer program generates one or more "entry events." Each entry event is made up of one or more "entry signals." Two entry events may be separated by a predetermined time interval. A series of entry events separated by predetermined time intervals comprise a password of the present invention. The password is stored in a memory accessible by computer 100.

Communication between computer 100 and network 104 is accomplished utilizing network interface device (NID) 102. NID 102 can be a LAN connection, a WAN connection, cable modem, digital subscriber line (DSL) modem, wireline modem or any other means of connecting computer 100 with a network. Network 104 can be a LAN, a WAN, the Internet or any other network that is capable of sending/transmitting data between computers, telephones or any other electronic devices (smart houses, appliances, etc.) capable of transmitting and receiving data.

Computer 106 is connected to network 104 and may communicate with computer 100. Computer 106 may attempt to access data, files or programs that are resident on computer 100. Because computer 100 is protected by a password of the present invention, computer 106 must present a password attempt that is recognized by the TSR portion of the computer program that monitors NID 102 in order to gain access to computer 100. If a password attempt is presented by computer 106 and the TSR portion of the computer program residing in computer 100 rejects the password attempt, computer 106 is unable to communicate with or access computer 100. Only when computer 106 presents a password attempt that matches the stored password is access to computer 100 granted.

Figure 1A:
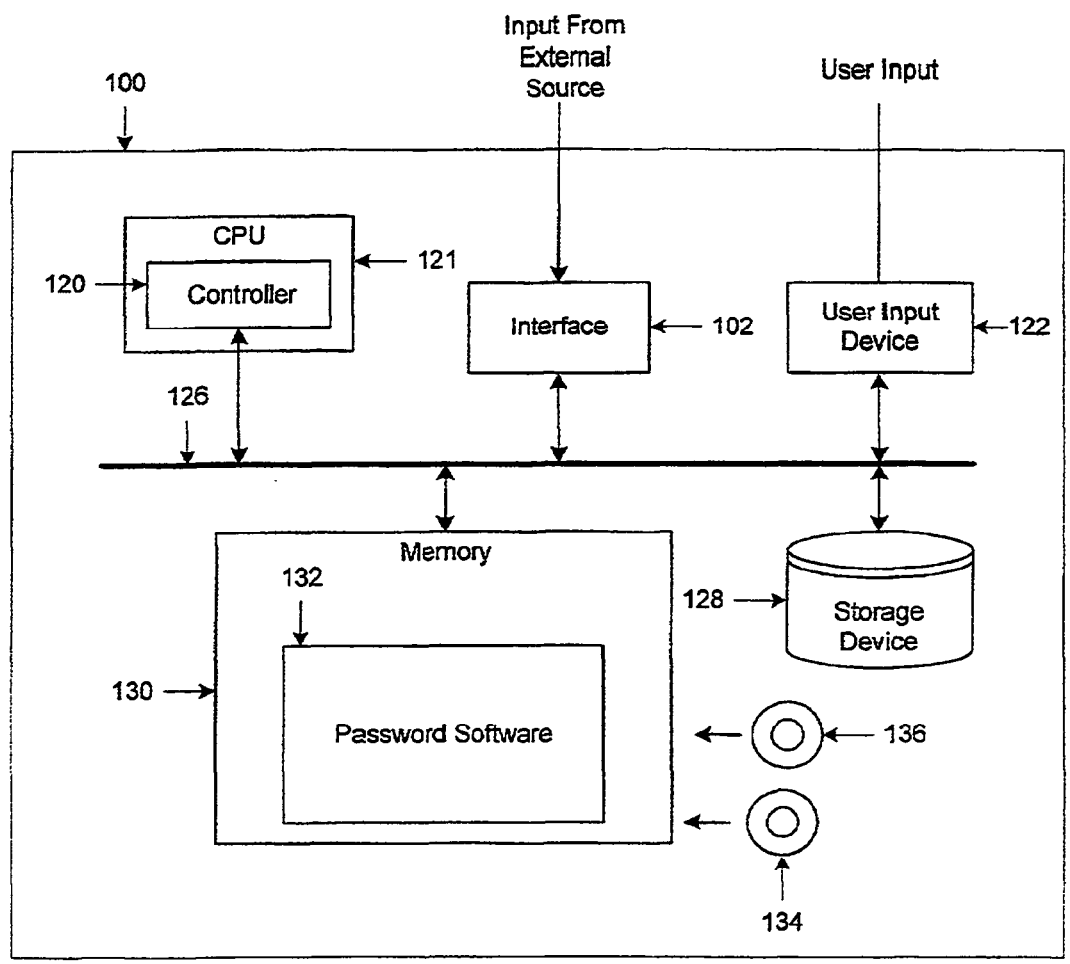
FIG. 1A is a high-level block diagram of an exemplary computer system in which an advantageous embodiment of the present invention is implemented.

FIG. 1A illustrates a high-level block diagram of computer 100. Computer 100 generally comprises central processing unit (CPU) 121, memory 130, storage device 128, external interface 102, and user input device 122. These elements of computer 100 are connected by and communicate through computer bus 126.

Computer 100 comprises memory 130 that contains password software 132 of the present invention. Controller 120 is depicted in this particular embodiment as contained within CPU 121. Controller 120 and password software 132 together comprise a password controller that is capable of carrying out the present invention. An operating system program (not shown) coordinates the operation of password software 132 with the operating system of controller 120.

Password software 132, under control of controller 120, identifies password attempts and individual password segments as they are received via interface 102. Interface 102 may comprise a network device, a modem, or any external connection device. A password attempt may also be received via user input device 122. User input device 122 may comprise a keyboard, a mouse, a floppy disk, etc. Password software 132 can detect a password attempt received by computer 100 from devices that provide local input and from network or modem type devices that provide remote input. A password attempt may be detected by receiving an entry event that signals a password attempt is to follow.

Controller 120 is capable of receiving user instructions from user input device 122. In response to user instructions, controller 120 is capable of instructing password software 132 to create elements of a new password and to modify elements of a previously stored password, where the password elements may comprise characters, symbols, numbers and time intervals. Controller 120 operates a portion of password software 132 to detect a password attempt from an external source. An external source includes, without limitation, a network connection, a modem connection, and any input device connected to computer 100 such as a keyboard, a mouse, a hard disk drive, etc. Controller 120 also operates password software 132 for comparing password attempts with a stored password (not shown in FIG. 1A).

Password software 132 is stored in memory 130 which may comprise random access memory (RAM) or a combination of random access memory (RAM) and read only memory (ROM). Memory 130 may comprise a non-volatile random access memory (RAM), such as flash memory. In an alternate advantageous embodiment of the present invention, password software 132 may be stored on a mass storage device, such as hard disk 128. In another alternate advantageous embodiment of the present invention, password software 132 may be stored on an attached peripheral drive or a removable disk drive (whether embedded or attached) of the type that reads a Read/Write DVD or a re-writable CD-ROM. These types of disk drives are illustrated schematically in FIG. 1A by Read/Write DVD 134 and re-writable CD-ROM 136.

Figure 2A:
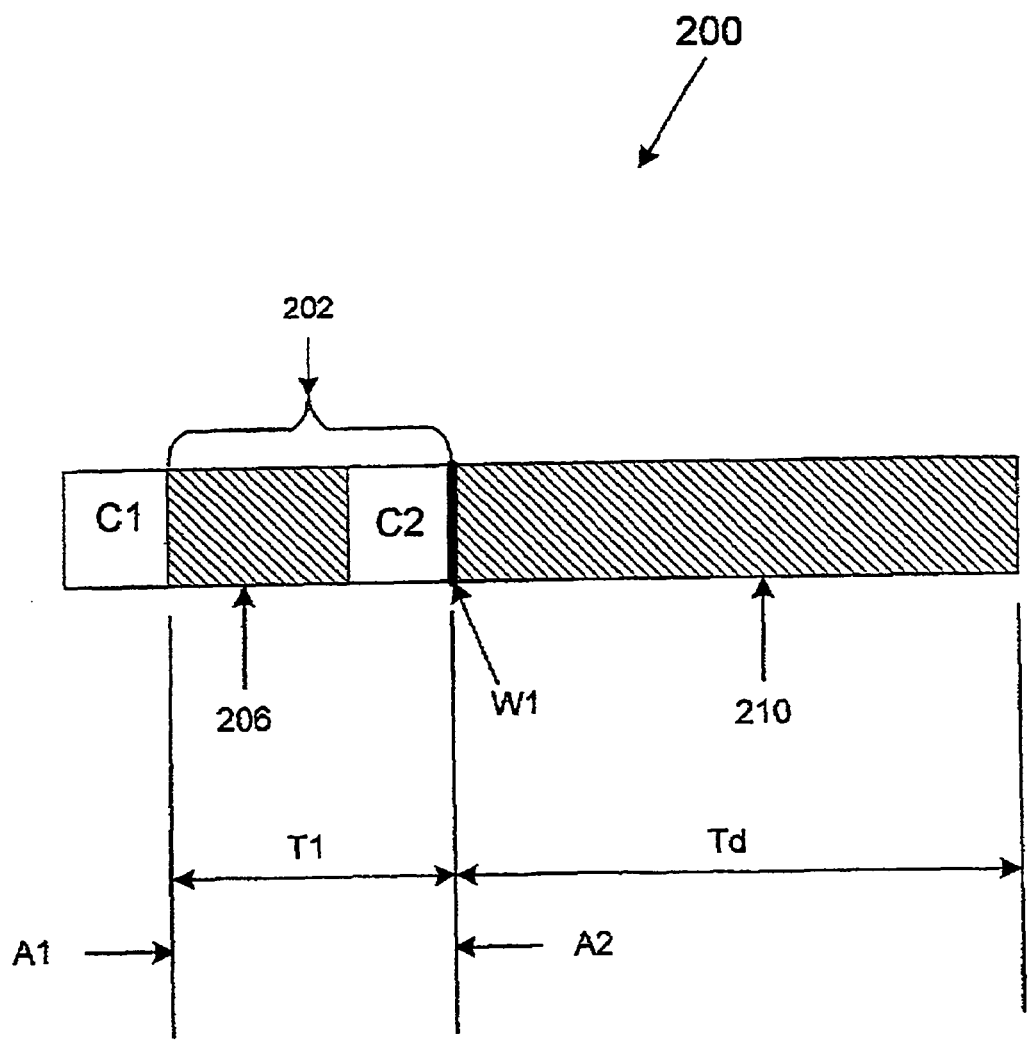
FIGS. 2A-E illustrate exemplary embodiments of the present invention in accordance with the principles of the present invention.

FIGS. 2A-2E illustrate exemplary embodiments of the password of the present invention. FIG. 2A depicts a high-level time-line for password 200 containing password segment 202 that comprises time interval 206 and entry event C2. A password comparison sequence is initiated when the TSR portion of the computer program recognizes an initial entry event/signal C1. The TSR portion of the computer program begins comparison of the incoming signals with the signals of the stored password. Entry event C1 acts as a start/sync character for the password detection algorithm. An entry event and an entry signal may be the same. However, there may be a plurality of entry signals that are required to produce a character (or characters) or a symbol (or symbols), etc., that make up a single entry event.

Initial entry event C1 serves to trigger an interval timer (not shown), controlled by password software 132, by causing the interval timer to set (or reset) to zero at time A1. In this embodiment, the timer is set upon detection of the trailing edge of entry event C1. After being set to zero, the interval timer starts calculating time intervals (in increments that may range from nanoseconds to days) for the incoming password attempt for comparison with the time intervals that are predetermined and incorporated into the stored password.

After initial entry event C1 is recognized by password software 132, a predetermined time interval 206 must occur. Time interval 206 is a period during which there are no entry events or entry signals. Should a character or entry signal be detected during time interval 206, password software 132 recognizes the "out of place" entry event as an invalid password attempt. In response to an invalid password attempt, time delay 210 is added to the actual time required to read the presented password and then returned as "access denied." Time delay 210 is an arbitrary period of time that is generated and added by password software 132 to prevent revealing any timing parameters of the stored password.

Predetermined time interval 206 follows initial entry event C1. Time T1 (segment time) is measured from the trailing edge of initial entry event C1 and represents the total amount of time of time interval 206 and entry event C2. Predetermined time interval 206 can be a user specified amount of time or a random time interval generated by the password generating portion (not shown) of password software 132. The time required for entry event C2 (and all subsequent entry events) is calculated by using the serial bit transfer rate (baud rate) of the actual incoming signal. The length of predetermined time interval 206 is calculated by subtracting the time of entry event C2 from the segment time T1. The second entry event C2, is compared to an incoming entry event (one or more computer readable signals) received by computer 100. Alternatively, time T1 may be calculated by starting the interval timer at a signal within a first group of signals that form an entry event and the ending within a second group of signals that form a subsequent entry event.

In all computer systems, there exists an inherent delay in the computer's processing time, which must also be taken into account when measuring time intervals. In the apparatus and method of the present invention, a plus or minus percentage deviation in baud rate and processing time is addressed by providing deviation window W1. Deviation window W1 is a deviation period that accommodates the additional times required for computer 100 to recognize and read a character or group of characters. The period of deviation window W1 is based on the baud rate of the incoming signals. Generally, a deviation window is plus or minus a percentage of the preceding time interval (see Table 1). Computer 100 recognizes entry event C2 during deviation window W1 and establishes time T1. Time T1 includes a password segment's predetermined time interval 206 and the character recognition time associated with entry event C2. Time T1 must end within deviation window W1. Time interval 206, entry event C1, and entry event C2 must match the password stored in computer 100 in order to be a valid password attempt.

If time T1 does not end within deviation window W1, then password software 132 detects the error and rejects the password attempt as invalid. Arbitrary time delay Td is added before sending the rejection of the password attempt to computer 106 that is requesting access. If time T1 ends within deviation window W1, the interval timer (not shown) that provides timing for the algorithm of the stored password is stopped, reset to zero, and then re-started for arbitrary time delay Td. A plurality of interval timers may be used to monitor time T1, time interval 206 and arbitrary time delay Td. At the conclusion of arbitrary time delay Td, if a correct password attempt has been presented, a successful password entry is acknowledged and access is granted.

Each entry event comprises of one or more predetermined entry signals that represent one or more numbers, letters, sounds, symbols, characters, etc., in any combination in the password structure. Those skilled in the art will appreciate that an entry event can, and usually does, comprise a plurality of groups of signals that represent a password.

Figure 2B:
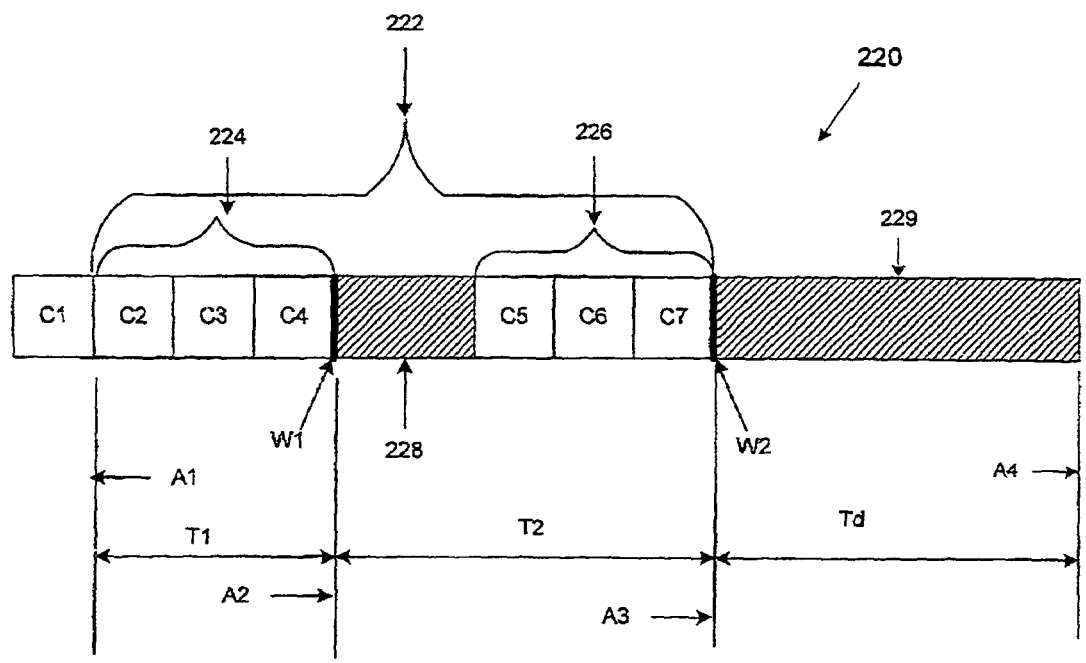

FIG. 2B illustrates a time-line of a password 220 according to another embodiment of the present invention. Password 220 comprises time envelope 222 (total time of the entire password 220) following an initial entry event C1, entry event 224 (comprising entry event C2, entry event C3, entry event C4, zero time interval and deviation window W1), time interval 228 and entry event 226 (comprising entry event C5, entry event C6, time interval 228, terminating entry signal C7 and deviation window W2). Each segment (at least one entry event) of the password must occur within password envelope 222. An arbitrary time delay, Td, that is equal to time segment 229 is then applied to the end of the password envelope 222 before sending an acceptance or a rejection of the presented password attempt to computer 106.

Figure 2C:
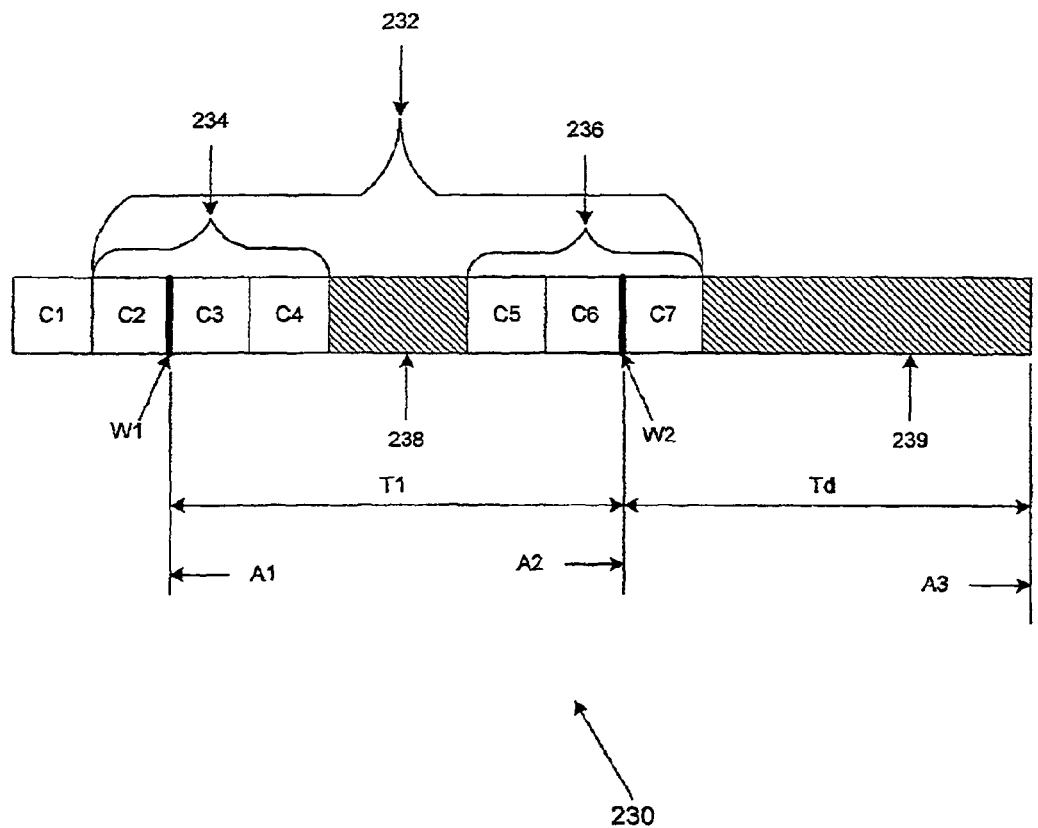

FIG. 2C illustrates a time-line of another password 230 according to another embodiment of the present invention. Password 230 comprises time envelope 232 following an initial entry event C1, entry event 234, time interval 238, entry event 236 and deviation windows, W1 and W2. Entry event 234 comprises entry signals C2, C3, and C4. Entry event 236 comprises entry signals C5, C6, and C7. In this embodiment, entry signal C1 is the initiating entry signal that triggers password software 132 to began comparing the incoming signals of a password attempt to the stored password. The total password 230, in this instance, comprises entry signals C2, C3, and C4, time interval 238, and entry signals C5, C6, and C7.

However, as predetermined by the user, interval timing begins at A1 in deviation window W1 after detecting the second entry signal at A1, continues through time interval 238, and ends in deviation window W2 upon detecting entry signal C6 at time A2. Then entry signal C7 is received. The password attempt is invalid if entry signal C7 is not detected. Password acceptance is delayed by an arbitrary amount of time Td. Time Td is the sum of the time of entry signal C7 and arbitrary time segment 239. Computer 100 then sends an "access denied" signal or an "access allowed" signal to computer 106 that is presenting the password attempt. The time Td is not a part of the presented password attempt and is not a part of the stored password. It is an element that is generated by password software 132 to mask the length of time envelope 232 so that computer 106 can not determine the length of the stored password.

Figure 2D:
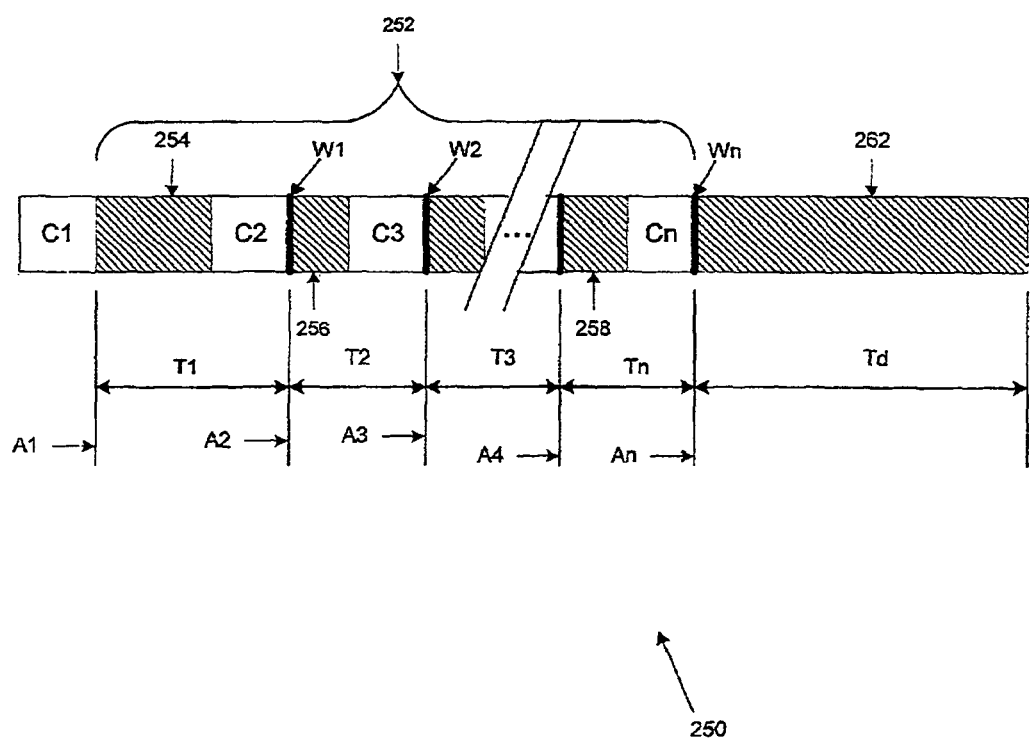

FIG. 2D illustrates a time-line of a password 250 that utilizes a plurality of password segments. Password 250 comprises time envelope 252 and entry signals C2, C3, . . . , and Cn, time intervals 254, 256, . . . , and 258, and deviation windows W1, W2, . . . , and Wn. Time envelope 252 is calculated from the trailing edge of initializing entry signal C1 to the trailing edge of entry signal Cn. Initializing entry signal C1 is detected by password software 132. The interval timer is then reset and begins timing time interval T1 at time A1. Time interval 254 is determined by subtracting the time of entry signal C2 time from time T1. Time T1 is the sum of time interval 252 and the time of entry signal C2 with a deviation factor of plus or minus a predetermined percentage of the total time. Deviation window W1 is typically a ten percent (10%) deviation.

Time interval 256 is determined by subtracting the time of entry signal C3 from time T2 which ends within deviation window W2. Time T2 is measured from the trailing edge of entry signal C2 to the trailing edge of entry signal C3. All the time intervals in this embodiment are determined in the same manner as time interval 254 and time interval 256. Times T1, T2, . . . , Tn may be utilized in an embodiment of the password, along with time intervals and deviation windows, as validation factors for a presented password attempt. Time Td is an arbitrary time delay 262 added when password software 132 sends an "access denied" signal or an "access allowed" signal to computer 106.

Figure 2E:
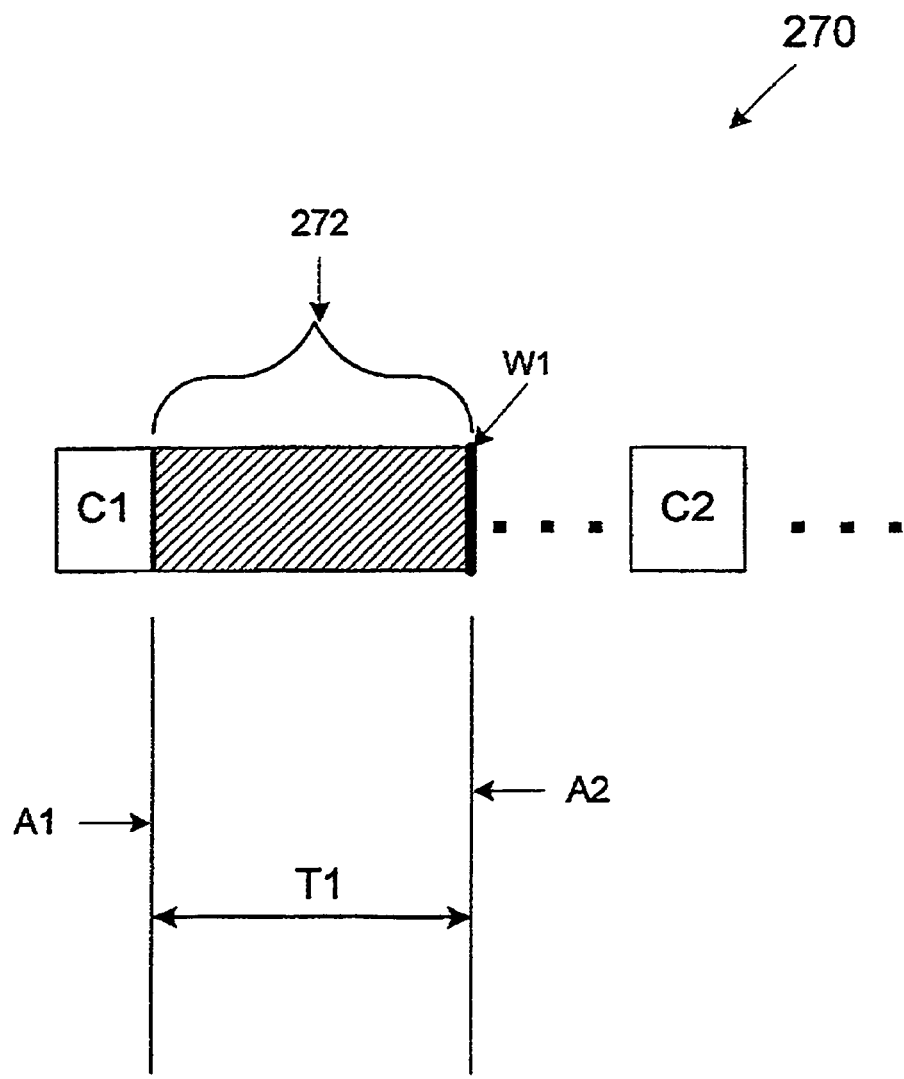

FIG. 2E depicts a time-line of a "time lockout" password 270 of the present invention. Initializing entry signal C1 signals password software 132 that a password attempt is being presented. The interval timer is reset and started at time A1. Time T1 272 is measured from the trailing edge of entry signal C1. Time T1 272 acts as a "time lockout" so that no other character entries will be considered by password software 132 before the interval timer, which began timing at time Al completes time interval 272. Any entry signal attempts from computer 106 will be answered with an arbitrary time delay Td (not shown) and an "access denied" signal sent to computer 106. Furthermore, time T1 must be complete (i.e., timed lockout ends within deviation window W1) before another entry event will be considered by password software 132. For example, a user may want to secure his computer overnight. In the process of activating the overnight password, the computer prompts the user for the password character(s) and the length of the desired lockout time T1. After the lockout time T1 has elapsed, password software 132 will then consider password entry attempts. Even so, the correct password, in this example entry event C2, must be entered to permit access to computer 100.

Each of the time intervals in a password can be any user-determined period of time. Further, the identity of the additional characters can (and should) be different from one another. A user can select time intervals and entry signals for inclusion in a password. Table 1 provides more detailed information concerning time intervals and entry signals for the time-line of password 250 shown in FIG. 2D.

TABLE 1

| Time Interval | Entry Event | Entry Event Time | Time T | Deviation |
|---|---|---|---|---|
| | C1 | | | |
| 999 ms (254) | C2 | 1 ms | 1000 ms | 900 ms < W1 < 1100 ms |
| 498 ms (256) | C3 | 2 ms | 500 ms | 450 < W2 < 550 ms |
| . . . | . . . | . . . | . . . | . . . |
| n ms (258) | Cn | 3 ms | (n + 3) ms | n ± 0.1 (N + 3) ms |

Table 1 indicates that password software 132 would read the first two segments in a maximum time of 1650 milliseconds (ms) Any additional time intervals and entry events add to the time of the time envelope. However, this does not include the variable and arbitrary time delay Td to disguise the actual length of time of the password.

The following password format is a literal representation of one embodiment of the password algorithm:

$$C1@A1+C2@A2+C3@A3+\ldots +Cn@An+Td \quad (1)$$

where "C1" is a password initiating entry signal (or entry event); "A1" is the point that the interval timer is reset and begins timing; "A2, A3 . . . and An" are the timing points for subsequent entry events and time intervals; "C2, C3, etc.," are individual entry events that can comprise one or more computer readable signals which include characters, numbers, symbols, etc.; "Cn" is the "nth" entry event; and "Td" is a variable time delay that password software 132 waits after determining whether a password attempt is acceptable to disguise the true time of the stored password when allowing or denying entry.

As discussed previously, one of the most common schemes used by hackers is a so-called "dictionary" attack. A dictionary attack provides multiple combinations of entry events, but requires continual confirmation from the computer system under attack to confirm any correct entries. A powerful feature of the present invention requires that the hacker wait until the entire password attempt is entered before determining whether the password attempt is correct. By restricting the confirmation of a successful password attempt until the password attempt is complete in real time, the present invention prevents a hacker from determining whether progress is being made. Effectively, the hacker has to wait for the entry of a complete password attempt which may require a time of several microseconds, or eight hours, or many days.

For example, if an authorized user selected a password that included multiple time entries and entry events that totaled ten (10) seconds, each password attempt would have to be exactly tem (10) seconds long. A hacker using computer 106 would only be permitted a password attempt once every ten (10) seconds. Even if the hacker was aware that a time based password was protecting computer 100 and presented time markers for verification, the password confirmation of the present invention includes a variable time delay, Td, that password software 132 adds before sending the message "access denied." This variable, and arbitrary, time delay is added to the password attempt and masks the true length of the stored password. The combinations could be virtually endless. A stored password could have a total time interval of eight hours or more. A stored password that might have a length of eight hours or more would discourage most hackers. Additionally, the arbitrary and variable time delay that password software 132 waits before responding to computer 106 provides a mask for the true time envelope of the stored password.

Figure 3:
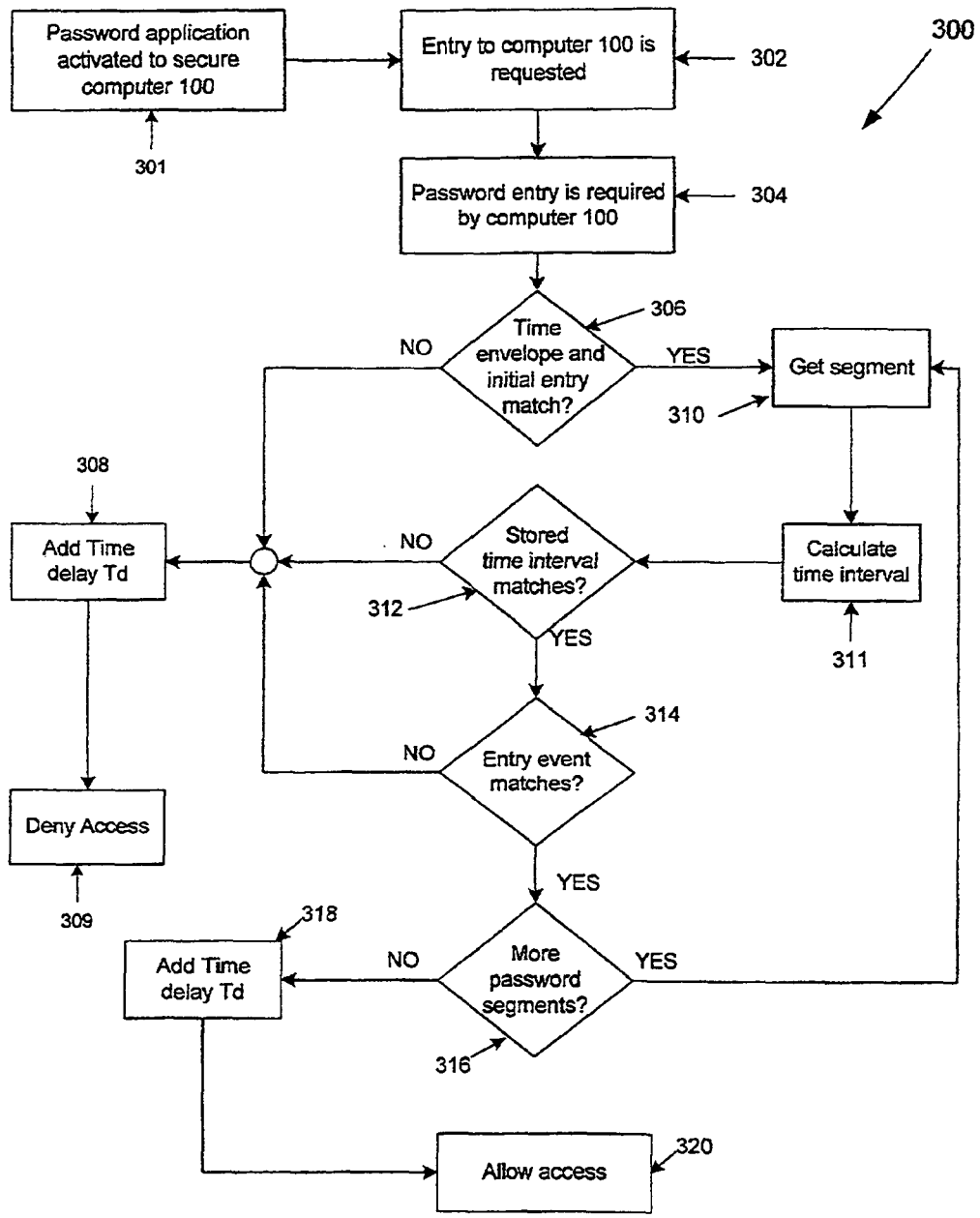
FIG. 3 is a high-level flow diagram illustrating the operation of an exemplary computer password protection system according to one embodiment of the present invention.

FIG. 3 depicts a high-level flow diagram illustrating the operation of an exemplary computer password protection system according to one advantageous embodiment of the present invention. The process steps are generally referred to with reference numeral 300. The process begins with a password being established and stored in computer 100, where computer 100 is subject to online entry, either authorized or unauthorized (process step 301). After the stored password is in place, an online entity (for purposes of this example, attacking computer 106) attempts to gain access to computer 100 via a modem or other communication interface device (process step 302). Protected computer 100 signals to the attacking computer 106 that a password is required (process step 304).

The attacking computer 106 transmits a password attempt in order to gain entry to the protected computer 100. Since the stored password of the present invention requires a complete password attempt before notifying attacking computer 106 of success or failure, a determination is made whether the time envelope (time measured from the first keystroke to the last keystroke) of a completely entered password attempt matches the stored password. After detecting an initial entry event (signal), the presented password attempt must be completely entered and submitted before any entry confirmation or denial is sent to attacking computer 106 (process step 306).

If the time envelope of the presented password attempt does not match the time envelope of the stored password for protected computer 100, the method of the present invention waits for an arbitrary time, time Td (process step 308) and access is denied to attacking computer 106 (process step 309). If the time envelope of the password attempt entered by attacking computer 106 matches the time envelope of the stored password, then protected computer 100 gets a first password segment (process step 310). Next, the method calculates the first time interval of the first segment (process step 311). If the first time interval (i.e., the time T1 minus the time of the entry event in the time segment) does not match the stored time interval of the first segment (process step 312), then the method of the present invention waits for an arbitrary time, time delay Td (process step 308) before notifying attacking computer 106 that access is denied (process step 309).

If the determination is made that the time interval of the first password segment of attacking computer 106 matches the time interval of the first segment of the stored password in computer 100, then the method of the present invention makes a determination of whether the entry event associated with the time interval matches the corresponding entry event of the stored password (process step 314). If there is no match, the method of the present invention waits for an arbitrary time, time delay Td (process step 308), and denies access to attacking computer 106 (process step 309). If there is a match, then the method of the present invention determines whether there are more password segments to be checked (process step 316). If there are more password segments, the method of the present invention then gets the next password segment (process step 311) and repeats the cycle of determining whether entry events and time intervals match (process steps 311-314).

If a determination is made in process step 316 that there are no more password segments (time interval and associated entry events) detected in the incoming password attempt, the incoming password attempt is deemed to present a valid password. The computer then waits an arbitrary period of time, Td, to mask the true length of the time envelope of the stored password (process step 318). The method of the present invention then grants access to protected computer 100 (process step 320).

The exemplary embodiments described above may be constructed from entries received from a computer keyboard. In other words, a user may design a stored password and password software 132 constructs the designed stored password. However, a stored password may be constructed automatically by utilizing a password software 132 that comprises a random character generator. Password software 132 can construct a stored password by inserting characters or signals for each entry event and by designating time intervals between the entry events. Thus, it is possible to generate a stored password that may be unknown to the password holder but is stored on a floppy disk (or other similar memory device). The password holder can use the password on a floppy disk to obtain access to computer 100. For remote access to computer 100, the holder of the stored password inserts the floppy disk into a remote computer 106. The floppy disk provides the stored password for remote entry access to protected computer 100. Even though storage of the stored password on a floppy disk may make computer 100 less secure, the stored password is useful if authorized access from a remote computer is required.

Figure 4:
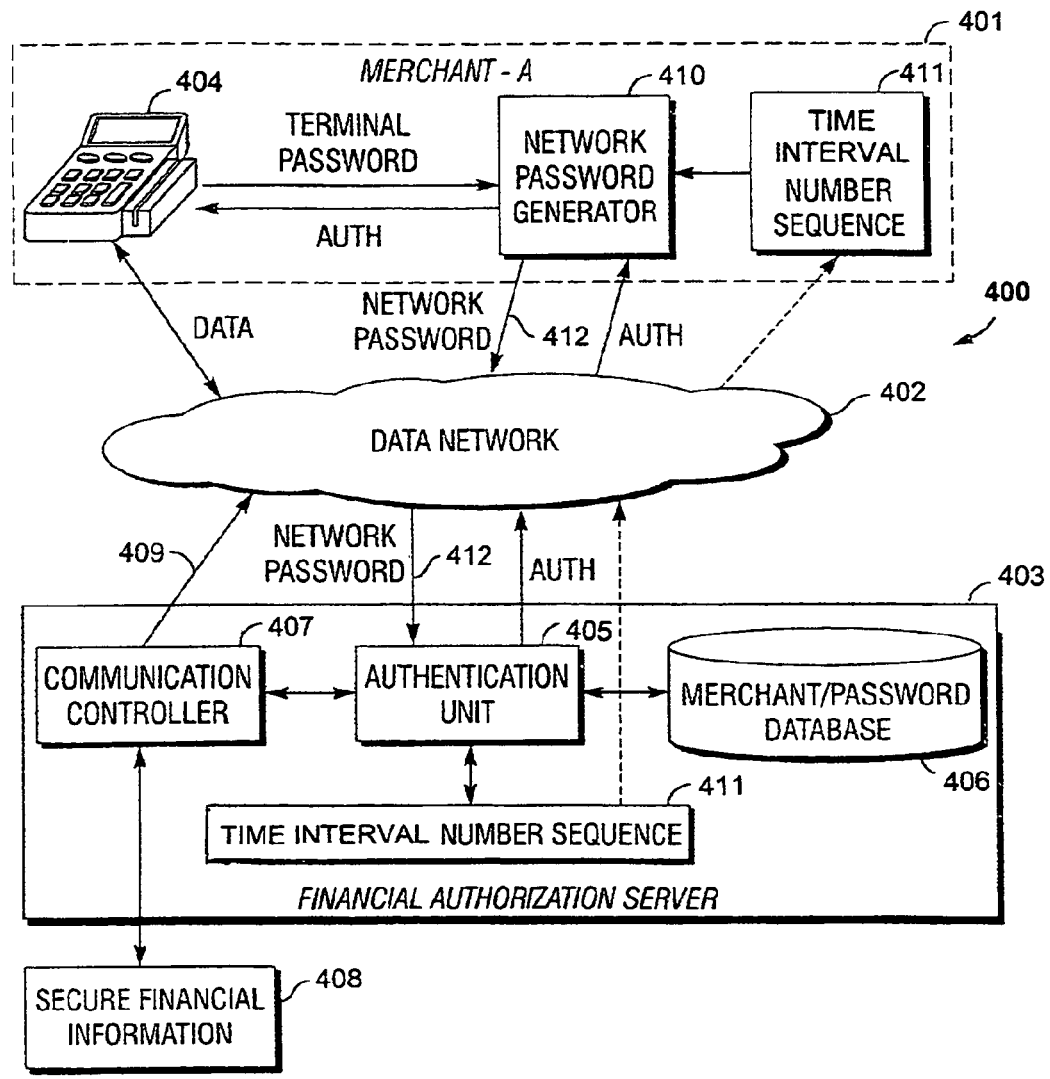
FIG. 4 is a simplified functional block diagram of an exemplary financial authorization network modified in accordance with the teachings of the present invention.

FIG. 4 is a simplified functional block diagram of an exemplary financial authorization network 400 modified in accordance with the teachings of the present invention. A plurality of merchant terminals such as Merchant-A 401 communicate through a data network 402 with a financial authorization server 403. Each merchant terminal 404 includes a magnetic card reader or equivalent device for inputting customer identification and/or credit information. The merchant terminals may be further connected on the merchant side with a point-of-sale (POS) system or intranet (not shown). The data network may be, for example, an Internet Protocol (IP)-based local area network (LAN), wide area network (WAN), or the Internet. The financial authorization server may include an authentication unit 405, a merchant/password database 406, and a communication controller 407.

In conventional operation, each merchant, for example Merchant-A 401, activates his terminal each morning when the merchant prepares to open for business. The terminal includes a serial number, and the merchant enters an ID number or password assigned to him by the operator of the financial authorization network. Together, the serial number and the ID number/password comprise a prior art terminal password that is transmitted through the data network 402 to the financial authorization server 403. The terminal password is received in the authentication unit 405, which accesses the merchant/password database 406 and compares the received terminal password with a stored password. If the passwords match, the authentication unit approves Merchant-A's terminal for financial transactions and sends an approval indication to the terminal. Thereafter, when a customer's credit card is read at the merchant terminal 404, the card number together with the terminal serial number are sent to the financial authorization server. The authentication unit 405 recognizes the serial number as being approved and sends the credit card information to the communication controller 407. The communication controller then accesses secure financial information 408 to determine whether the credit card number is approved for the transaction. The controller then returns either a positive or negative indication 409 to the Merchant-A terminal.

In some networks, the merchant terminal may send its terminal password along with each credit card transaction. When the authentication unit 405 positively authenticates the password, the credit card information is passed to the communication controller 407 for access to the secure financial information 408.

In the present invention, the merchant terminal environment is modified to include a network password generator 410. The network password generator may be implemented internally in the merchant terminal or in a separate unit that interfaces with the merchant terminal. The terminal sends its standard terminal password (e.g., serial number and merchant ID) to the network password generator. A time interval number sequence 411 is also input to the network password generator, which generates a time-multiplexed network password 412 by inserting the appropriate time intervals between the packets of the terminal password, as specified by the time interval number sequence. The time interval number sequence may be input via a standard network connection from the financial authorization server, via a secure encrypted connection, or via a physical medium such as a CD delivered to the merchant.

The network password generator 410 then sends the time-multiplexed network password 412 through the data network 402 to the server 406. The authentication unit 407 receives the network password and compares the characters received with a stored password in a merchant/password database 408. The authentication unit also compares the time intervals between the received characters with the current number set from the time interval number sequence 411, which is shared between the terminal and the server. The authentication unit positively authenticates the network password only if the received characters match the stored characters, and the time intervals between the received character-carrying packets matches the number specified by the time interval number sequence.

If the network password 412 is accompanied by a credit card number from a credit card transaction, and the authentication unit network positively authenticates the password, the credit card information is passed to the communication controller 407 for access to secure financial information 408.

In an alternative embodiment, the time interval number sequence 411 is stored only in the authorization server 403. Following a successful verification, the server sends a response message back to the merchant terminal. The response may include a next interval or set of intervals to be used by the terminal to create the time multiplexed network password. The intervals may be encoded in the response message to prevent interception by hackers or snoopers. Alternatively, the response message may include a value or values that do not directly indicate the time interval(s) to be inserted by the terminal. Instead, the terminal may be programmed with a formula that calculates the time intervals based on the value(s) received from the server. Alternatively, the terminal may include a lookup table that associates each value received from the server with a corresponding time interval to be inserted in the password.

For example, if the same time interval is to be placed between each of the characters in the password, the server may send a single value such as 24. The terminal may calculate a time interval from the value 24, or may associate a time interval with the value 24 in a lookup table, to determine that an interval such as 150 ms is to be placed between each character in the password. If a different time interval is to be placed between each of the characters in a password having, for example, 5 characters, the server may send a string of values such as 24, 10, 18 and 5. The terminal may calculate a time interval from each of the received values, or may associate a time interval with each of the received values in a lookup table, to determine four time intervals to place between the five characters. For example, time intervals such as 150 ms, 75 ms, 250 ms, and 1 second may be determined and placed between the characters in the password. Alternatively, the lookup table may associate a single value with a sequence of time intervals. Thus, the server may send a single value such as 24, and the terminal may determine that the intervals 150 ms, 75 ms, 250 ms, and 1 second are to be placed between the characters in the password.

Figure 5:
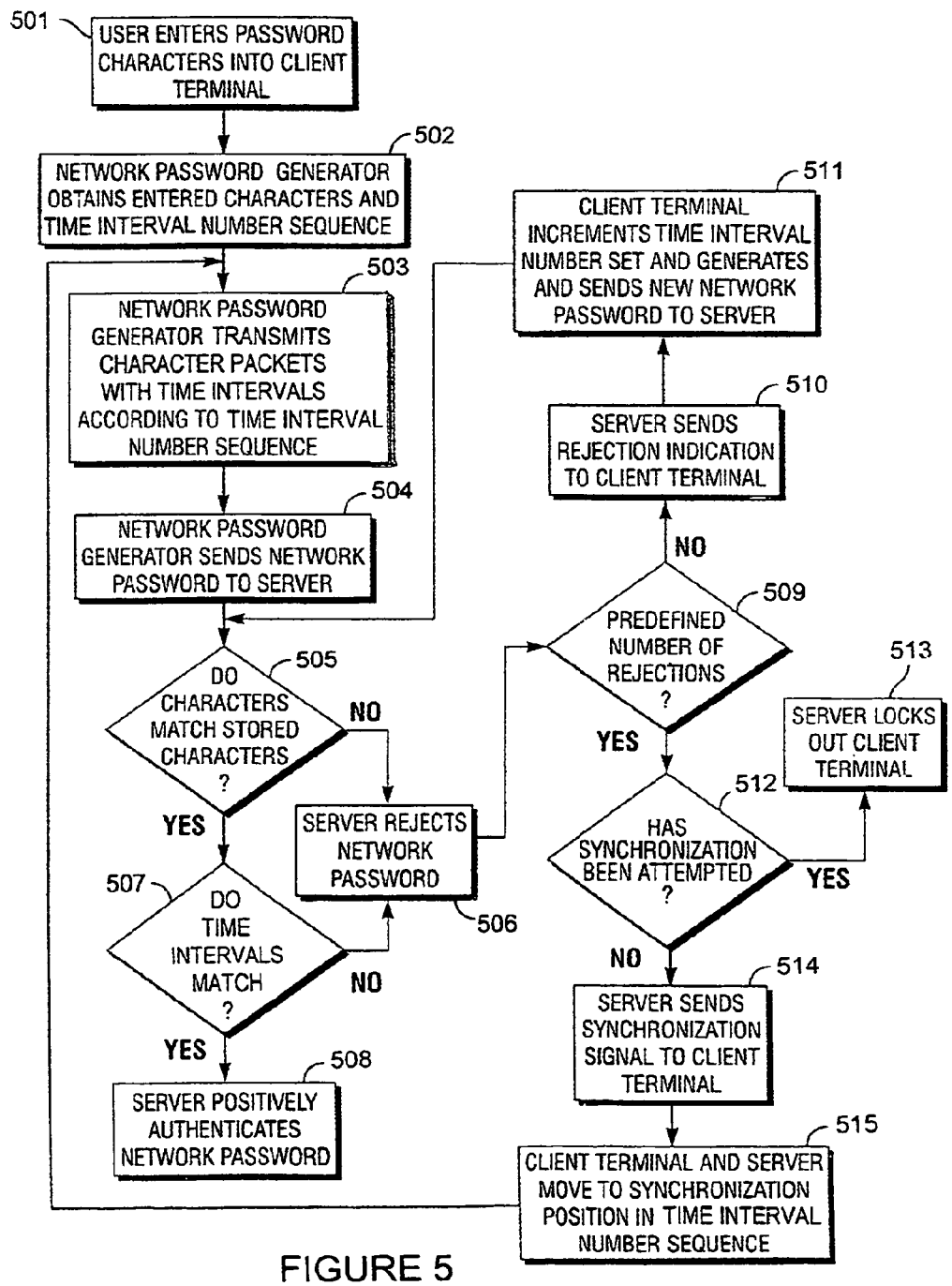
FIG. 5 is a high-level flow diagram illustrating the steps of an exemplary embodiment of a method of generating and authenticating a password according to the teachings of the present invention.

FIG. 5 is a high-level flow diagram illustrating the steps of an exemplary embodiment of a method of generating and authenticating a password according to the teachings of the present invention. Starting at step 501, a user enters the characters of a password into a client terminal. At step 502, a network password generator associated with the client terminal obtains the entered password characters from the client terminal and obtains a time interval number sequence that is shared with an authentication server. At step 503, the network password generator places the characters in packets and transmits the character packets with the appropriate time intervals between the packets in accordance with the time interval number sequence. At step 504, the network password generator sends the network password to the server.

At step 505, an authentication unit associated with the server determines whether or not the characters received in the network password match the characters of a stored password associated with the client terminal. If not, the process moves to step 506 where the server rejects the network password. However, if the characters match at step 505, the process moves to step 507 where the authentication unit determines whether or not the time intervals between each pair of character-carrying packets matches the time intervals specified by the time interval number sequence. If the time intervals match at step 507, the process moves to step 508 where the server positively authenticates the network password. However, if the time intervals do not match, the process moves to step 506 where the server rejects the network password.

The process then moves to step 509 where the server determines whether this client terminal has experienced a predefined number of password rejections. If not, the process moves to step 510 where the server sends a rejection indication to the client terminal. At step 511, the client terminal increments the time interval number set and generates and sends a new network password to the server. The process then returns to step 505 and repeats the authentication process for the new password.

If it is determined at step 509 that the client terminal has experienced the predefined number of password rejections, the process moves to step 512. Since multiple password rejections may be caused by the client terminal and server being out of synch regarding the correct position in the time interval number sequence, the process determines at step 512 whether or not synchronization has already been attempted. If so, the process moves to step 513 where the server locks out the client terminal. However, if synchronization has not yet been attempted, the process moves to step 514 where the server sends a synchronization signal to the client terminal specifying a synchronization position in the time interval number sequence, or alternatively, instructing the client terminal to go to a predefined synchronization position. At step 515, both the client terminal and the server move to the synchronization position in the time interval number sequence. The process then returns to step 503 where the network password generator generates a new password using the characters entered by the user and inserting time intervals between the character-carrying packets in accordance with the synchronization position in the time interval number sequence. The process then continues with the authentication procedure. If the client terminal is an authorized terminal that was temporarily out of synch with the server, the synchronization process should correct the problem, and the password should be positively authenticated. If the client terminal is a hacker, who does not know to insert time intervals or does not have access to the time interval number sequence, the synchronization process will not correct the problem, and the hacker will be denied access.

A benefit of the present invention is that it is transparent to the user. That is, the user always uses the same terminal (with the same serial number) and the same password or ID for every transaction. The terminal and server change the network password as often as the network operator desires by changing the time intervals between packets in the manner and at the frequency defined by the network operator. The user does not have to remember multiple passwords or change his password on a periodic basis. Even if a hacker knows the user's password, the hacker cannot gain access. Since any time interval can be inserted between any two characters in the password, the combination of characters and time intervals is practically limitless. Also, the system may change the time intervals between each pair of password characters as often as each transaction. Therefore, even if a hacker intercepts a transmission and determines the time intervals between each pair of character-carrying packets, the intervals may change in the next transmission, denying the hacker access to the network.

Figure 6:
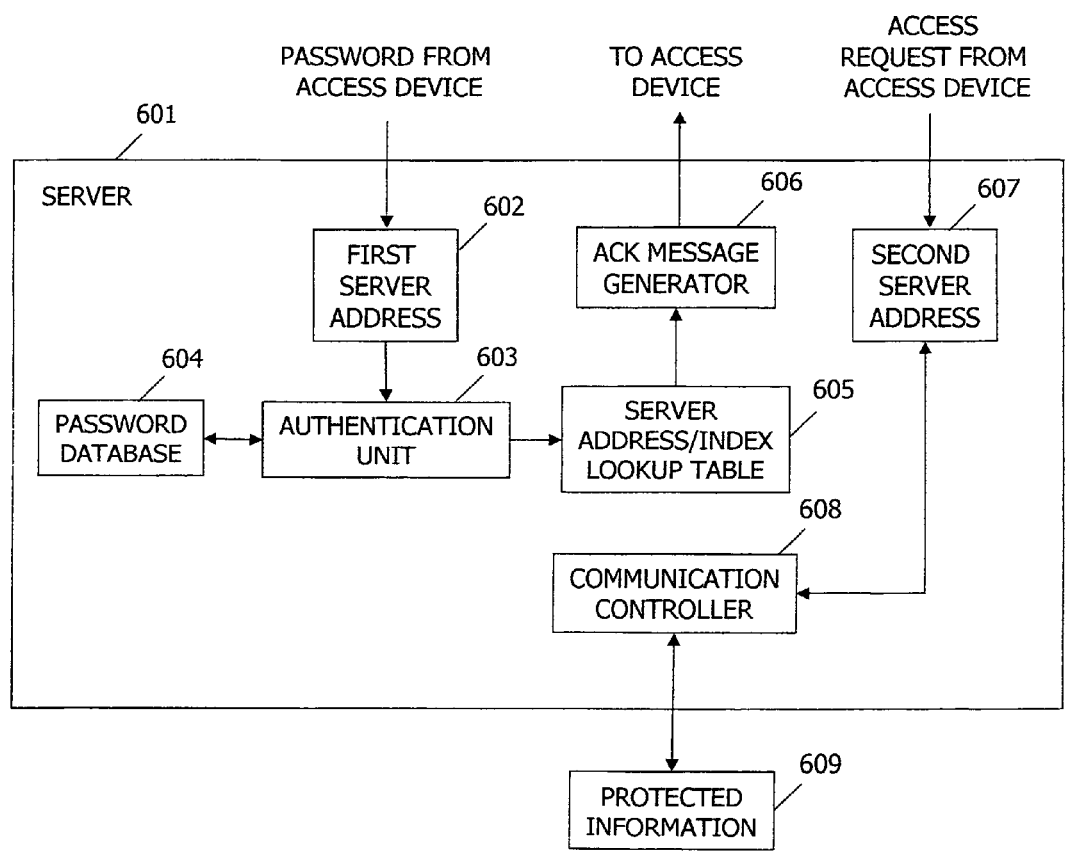
FIG. 6 is a simplified functional block diagram of an exemplary authentication server in another embodiment of the present invention.

FIG. 6 is a simplified functional block diagram of an exemplary authentication server 601 in another embodiment of the present invention. In this embodiment, designed to defeat a hacker who has obtained a user's password, the server authenticates the password and then redirects the access device to another IP address 607 known only to authorized access devices. A password is received from the access device at a first server address 602. An authentication unit 603 authenticates the password by comparing the received password with a password stored in a password database 604. Upon successful authentication, a server address/index lookup table 605 is accessed to obtain an index for the second server address 607.

An acknowledgment message generator 606 creates an acknowledgment message and includes the index of the second server address. The index may be randomly generated to preclude patterns in the use of server addresses. The server sends the acknowledgement message to the access device. The access device also includes a server address/index lookup table (which may be in a protected area), where the access device determines the second server address. The access device then sends an access request to the second server address 607. Upon receipt of the access request at the second server address, the server 601 provides the access request to a communication controller 608 and access is granted to protected information 609.

It should be noted that this embodiment is also effective against phishing sites where the user has been directed to a fake website which simulates a real website such as the website for the user's bank. The hacker may request the user to enter his password and his account number at the fake website. The hacker then attempts to access the user's account at his bank utilizing this information. With this embodiment, however, the access device expects to receive a proper index value pointing to another address in the client's lookup table. If no such index is received, or if an improper index is received, the client device may alert the user that he may be at a fake website. Note that if the hacker returns a proper index, he will lose the user because the access device will switch to a different address to send the access request to the server.

Figure 7:
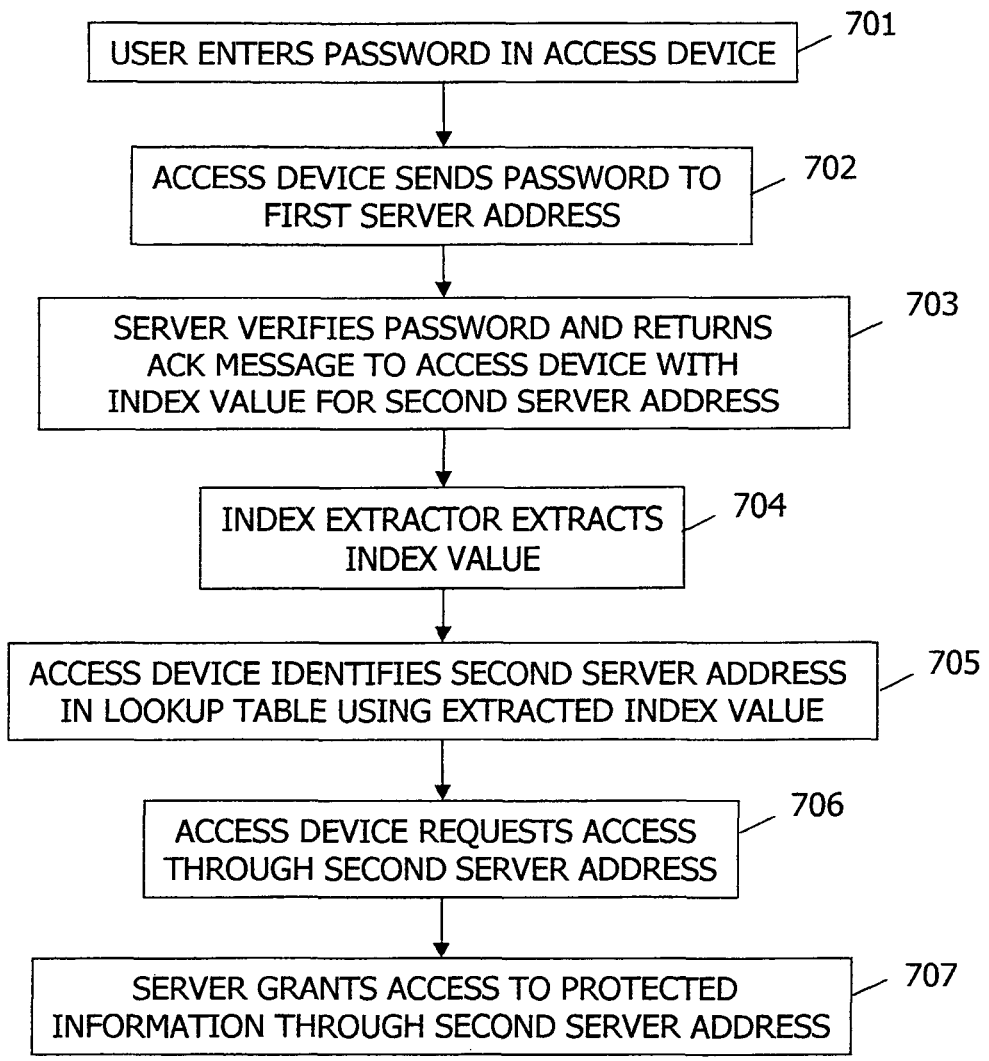
FIG. 7 is a high-level flow diagram illustrating the steps of an exemplary embodiment of a method of authenticating a password performed by the server of FIG. 6.

FIG. 7 is a high-level flow diagram illustrating the steps of an exemplary embodiment of a method of authenticating a password performed by the server of FIG. 6. At step 701, the user enters his password in an access device. At step 702, the access device sends the password to the first server address 602. At step 703, the server verifies the password and returns an acknowledgment message to the access device with an index value for the second server address 607. At step 704, an index extractor in the access device extracts the index value. At step 705, the access device identifies the second server address in a lookup table using the extracted index value. At step 706, the access device requests access through the second server address 607. At step 707, the server grants access to the protected information 609 through the second server address.

Figure 8:
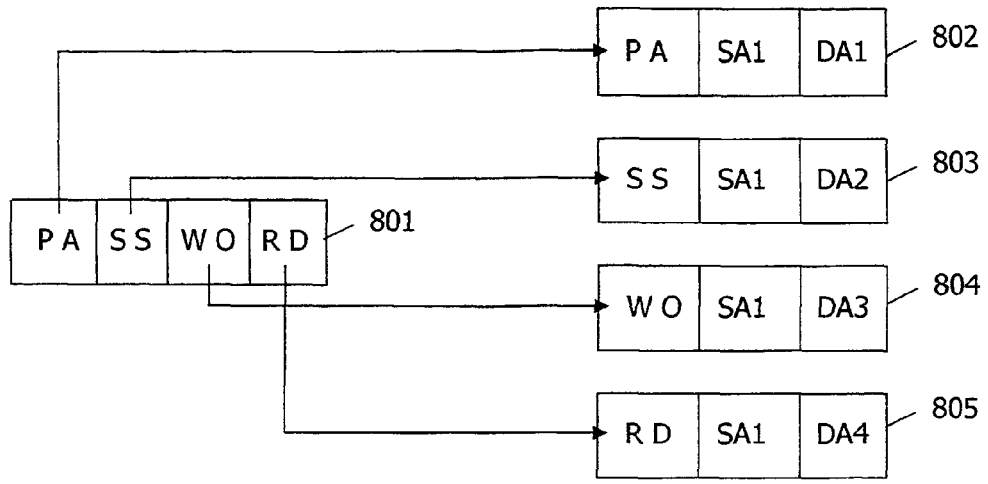
FIG. 8 illustrates an exemplary embodiment of a multi-character password divided into segments and placed into different data packets in accordance with another embodiment of the present invention.

FIG. 8 illustrates an exemplary embodiment of a multi-character password divided into segments and placed into different data packets in accordance with another embodiment of the present invention. In this embodiment, multiple IP addresses are assigned to the server, and are known only to authorized access devices. The access device divides the password 801 into multiple segments and places each segment in a different packet 802-805. The header of each packet includes an identifier such as a source address (SA1) that identifies the access device. Each packet header also includes a different one of the multiple IP addresses of the server as a destination address. The access device then sends the packets individually to the server. In one embodiment, the access device delays transmission of successive packets by predefined time periods known only to the access device and the server. Any hacker who has learned one of the server's IP addresses, and is monitoring that address to intercept passwords, will see only one portion of the user's password.

Figure 9:
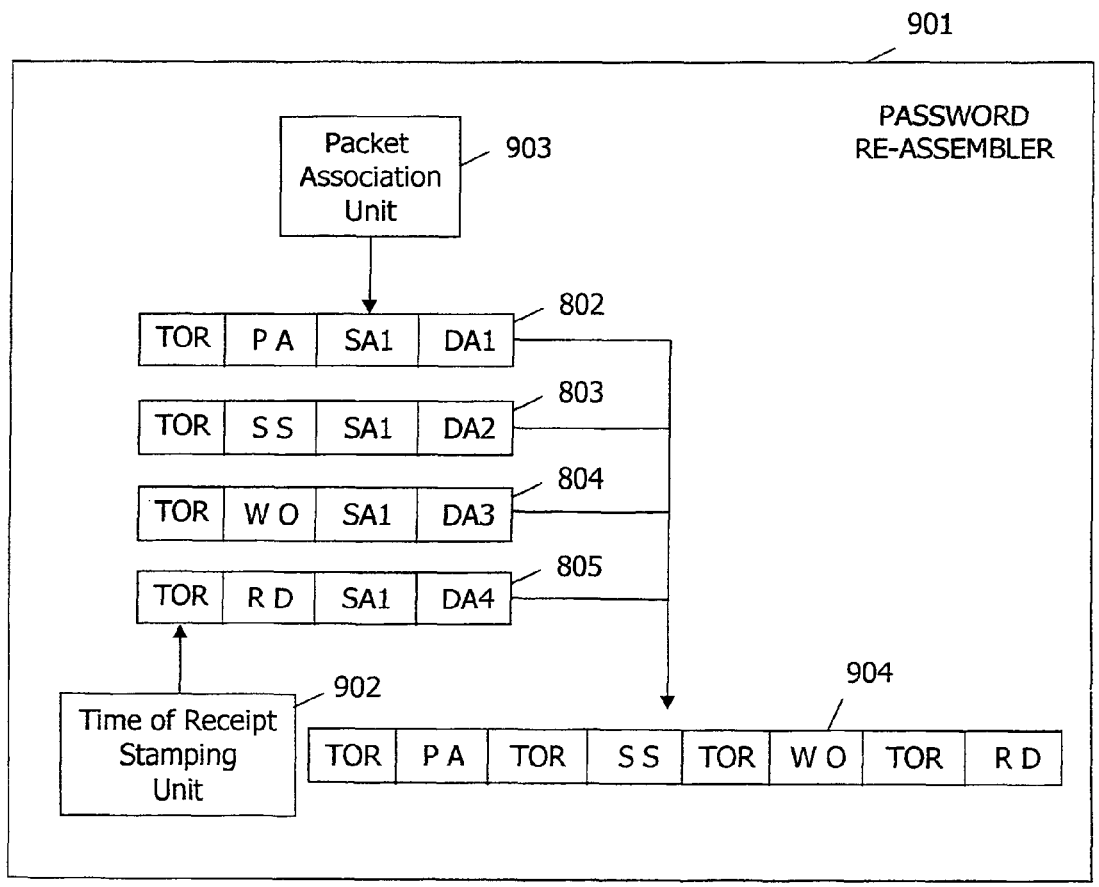
FIG. 9 is a simplified functional block diagram of an exemplary password re-assembler in an authentication server suitable for reassembling the password of FIG. 8.
Figure 10:
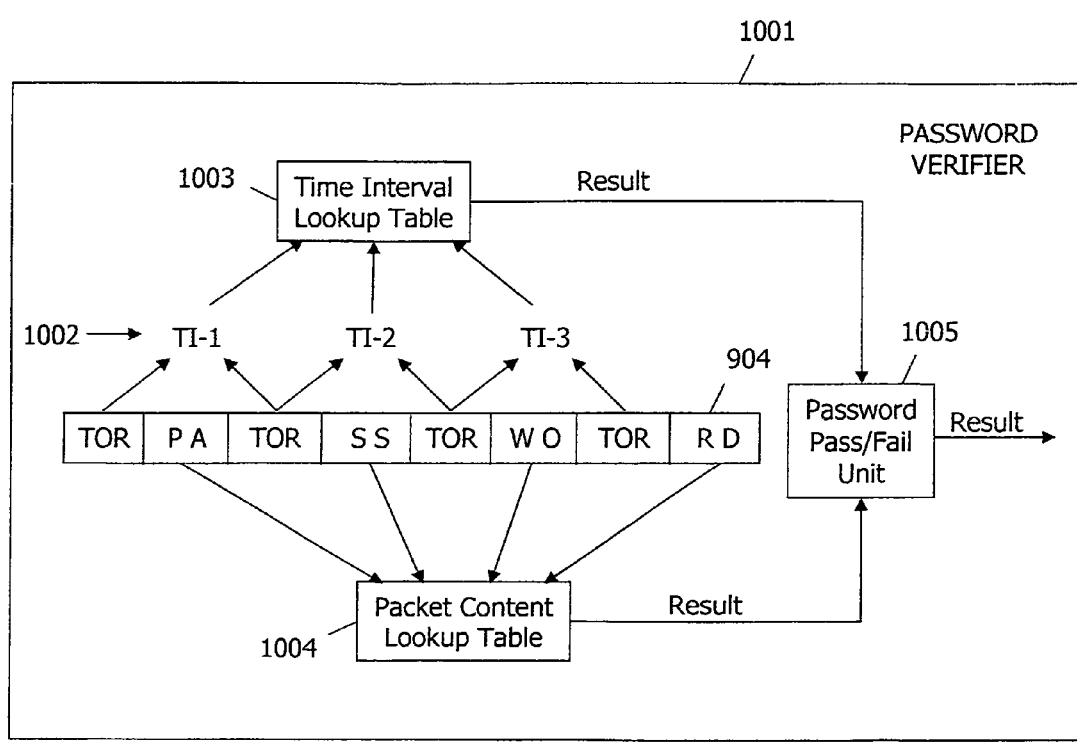
FIG. 10 is a simplified functional block diagram of an exemplary password verifier in an authentication server suitable for verifying the reassembled password shown in FIG. 9.

FIG. 9 is a simplified functional block diagram of an exemplary password re-assembler 901 in an authentication server suitable for reassembling the password of FIG. 8. Upon receiving each packet at the server, a time-of-receipt stamping unit 902 places a time-of-receipt stamp on each incoming packet 802-805. A packet association unit 903 may use the identifier of the access device or other identifier to associate the different packets which comprise the password. The data portions of the associated packets are then combined into a reassembled password 904 and sent to a password verifier 1001 (FIG. 10). If time delays are also being utilized as a second or third factor of the password, the time-of-receipt stamps are also sent to the password verifier.

FIG. 10 is a simplified functional block diagram of an exemplary password verifier 1001 in an authentication server suitable for verifying the reassembled password 904 of FIG. 9. If time delays are being utilized as a second or third factor of the password, the verifier calculates the difference between each succeeding time-of-receipt stamp to determine time intervals 1002, labeled as TI-1 through TI-3 in FIG. 10. A time interval lookup table 1003 determines whether the calculated time intervals match stored time intervals associated with the access device. A tolerance factor may be applied to account for small variances in the time intervals due to timing delays in the data network between the access device and the server. The result is sent to a password pass/fail unit 1005. Likewise, a packet content lookup table 1004 determines whether the data portions of the reassembled password match stored packet content information associated with the access device. The result is sent to the password pass/fail unit. The password pass/fail unit verifies the password only if the password characters are correct, the packet content of each packet is correct, and the time intervals between packets are correct, within any predefined tolerance values.

Figure 11:
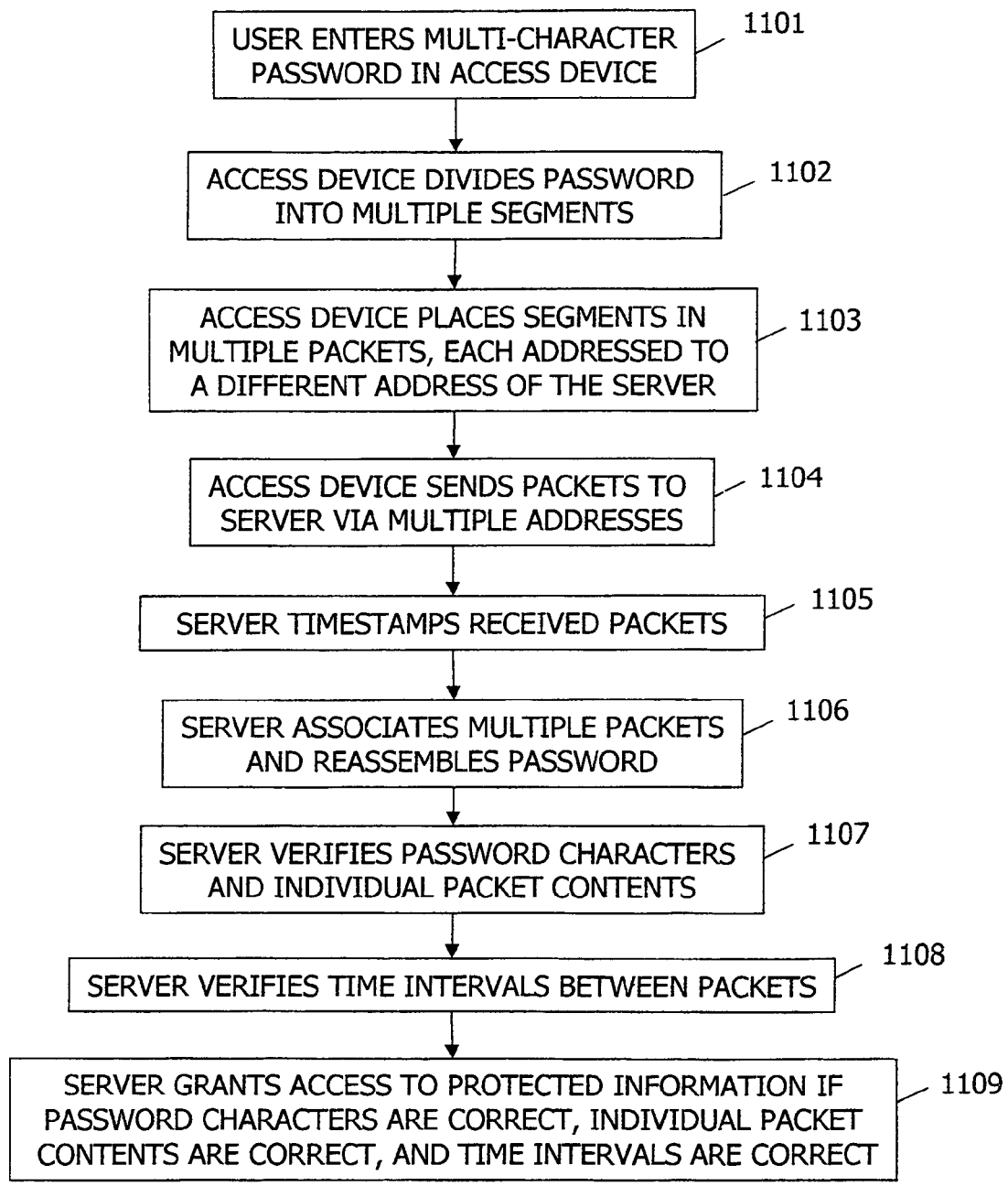
FIG. 11 is a high-level flow diagram illustrating the steps of an exemplary embodiment of a method of sending, reassembling, and verifying the password of FIG. 8-10.

FIG. 11 is a high-level flow diagram illustrating the steps of an exemplary embodiment of a method of sending, reassembling, and verifying the password of FIGS. 8-10. At step 1101, the user enters a multi-character password in the access device. At step 1102, the access device divides the password into multiple segments. At step 1103, the access device places the segments in multiple packets, each addressed to a different address of the server. At step 1104, the access device sends the packets to the server via the multiple server addresses.

At step 1105, the server receives the packets and places a time-of-receipt stamp on each received packet. At step 1106, the server utilizes the identifier of the access device to associate the multiple packets and reassemble the password. At step 1107, the server verifies that the password characters of the reassembled password are correct, and the packet contents of each individual packet match stored packet contents associated with the access device. At step 1108, the server calculates time intervals between the packets and verifies that the calculated time intervals match stored time intervals associated with the access device. At step 1109, the server grants access to protected information if the password characters are correct, the packet content of each packet is correct, and the time intervals between packets are correct, within any predefined tolerance values.

Figure 12:
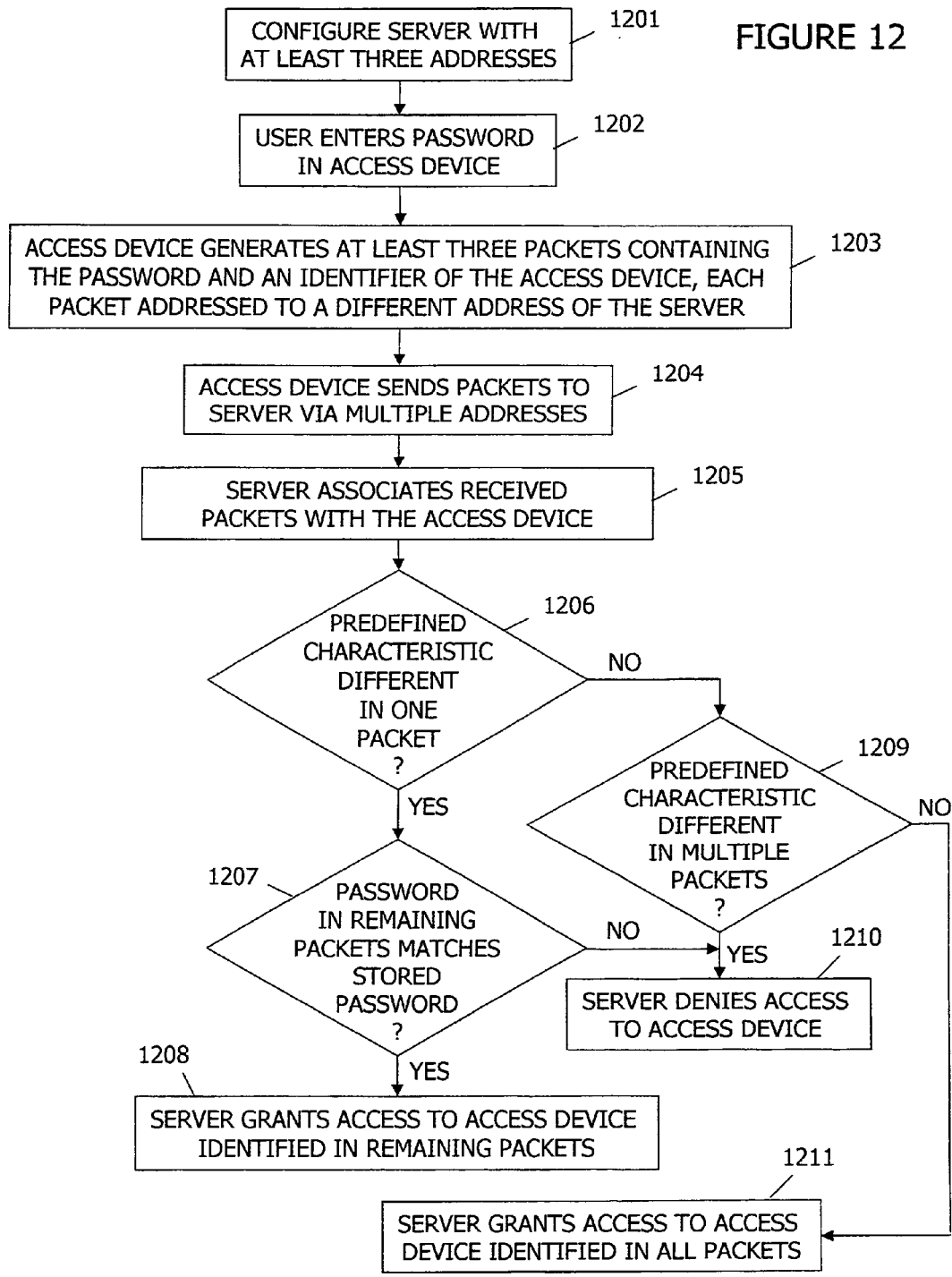
FIG. 12 is a high-level flow diagram illustrating the steps of another exemplary embodiment of a method of generating and authenticating a password according to the teachings of the present invention.

FIG. 12 is a high-level flow diagram illustrating the steps of another exemplary embodiment of a method of generating and authenticating a password according to the teachings of the present invention. In this embodiment, multiple addresses are assigned to the server, and are known only to authorized access devices. The access device sends its password in different packets to several of the server's addresses. If a hacker intercepts one of the password packets and attempts to gain access, a predefined characteristic of the packet will be changed. For example, the access device may transmit the packets with time delays known to the server. The hacker's interception and modification of a packet will cause an excessive delay, which is recognized by the server. Thereafter, the server may deny access or may grant access to the access device identified in the packets that were timely received.

At step 1201, the server is configured with at least three addresses. At step 1202, the user enters his password in the access device. At step 1203, the access device generates at least three packets containing the password and an identifier of the access device. Each packet is addressed to a different address of the server. At step 1204, the access device sends the packets to the server via the multiple addresses. The packets may be transmitted with one or more predefined time delays between the subsequent packets.

At step 1205, the server receives the packets and utilizes the identifier to associate the received packets with the access device. At step 1206, the server determines whether a predefined characteristic is different in one of the received packets. This characteristic may be, for example, the identifier of the access device, a source address, or the expected time of receipt of the packet. If a predefined characteristic is different in one of the received packets, the method moves to step 1207, where the server determines whether the password in the remaining packets matches a stored password for the identified access device. If so, the method moves to step 1208, where the server grants access to the access device identified in the remaining packets. If the password in the remaining packets does not match the stored password for the identified access device, the method moves instead to step 1210, where the server denies access to the access device.

If it is determined at step 1206 that the predefined characteristic is not different in one of the received packets, the method moves to step 1209 where it is determined whether the predefined characteristic is different in multiple packets. If so, the method moves to step 1210 where the server denies access to the access device. If the predefined characteristic is not different in multiple packets at step 1209, then it is the same in all received packets. Therefore the method moves to step 1211 where the server grants access to the access device identified in all received packets.

Figure 13:
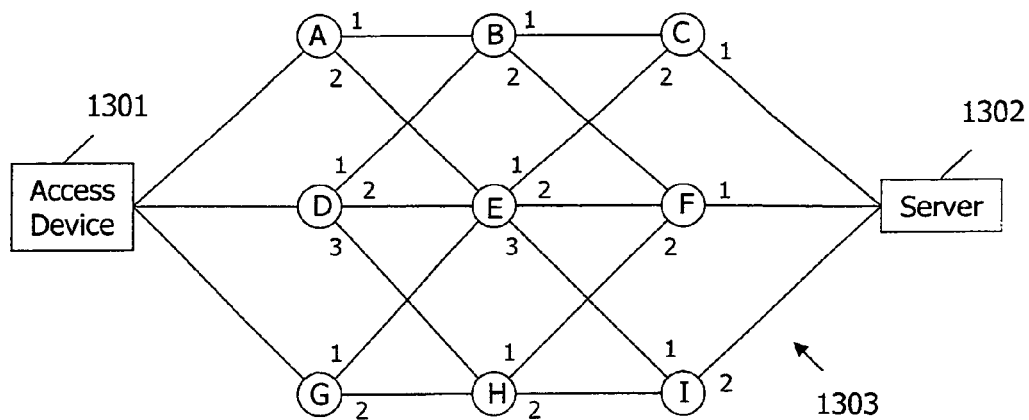
FIG. 13 illustrates a data network topology in which forced packet routing is implemented.

FIG. 13 illustrates a data network topology in which forced packet routing is implemented. In one embodiment, routers in the network are modified with a dynamic routing table. When a packet is received with a predefined destination address associated with, for example a financial institution, the router is programmed to send the packet out on a designated port. For example, an access device 1301 may send password packets over a network 1303 to a server 1302 located at a bank. Router-A may be programmed to send packets with the bank's destination address on port 1 to Router-B. Likewise, Router-B may be programmed to send packets with the bank's destination address on port 1 to Router-C. At some later time, the routing table may be modified so that Router-A sends packets with the same destination address on port 2 to Router-E, which is programmed to send the packets through either port 1, 2, or 3 to Router-C, Router-F, or Router-I, respectively. Thus, rather than letting the routers choose the shortest path or lightest loaded path, which may almost always be the same, the routers are forced to vary the path according to their dynamic routing tables.

In one embodiment of the present invention, the access device 1301 divides the password into multiple segments and sends each segment in a different packet to a different router. The first packet may be sent to Router-A, the second packet to Router-D, and the third packet to Router-G, for example. Each packet includes the bank's address as its destination address. Each router uses its dynamic routing table to further route the packet it receives. If a hacker is monitoring a router such as Router-D because it is on the shortest path to the server 1302, the hacker will only see the second packet and will not learn all of the characters of the password.

In another embodiment of the present invention, the server 1302 has multiple IP addresses which are known to the access device 1301. The access device divides the password into multiple segments and sends each segment in a different packet. Each packet is addressed to a different IP address of the server.

The routers in this embodiment may be configured with static routing tables. When a packet is received with a predefined destination address, the router is programmed to send the packet out on a designated port. The password packets follow different routes to the server because the routing tables route packets addressed to the different IP addresses through different ports of each router. Thus, packet routing is changed by changing the destination address. Once again, if a hacker is monitoring a router such as Router-D because it is on the shortest path to the server, the hacker will not learn all of the characters of the password.

It should also be understood that the forced packet routing of the present invention may be performed through nodes other than routers. For example, if a large corporation or financial institution has many offices and many servers distributed around the country, the routing tables may be implemented in the company's servers and the password packets may be routed through intermediate company servers before arriving at the authentication server. The intermediate servers may perform the functions described above for routers. In this manner, forced packet routing may be achieved even though the company has no control over routers, for example, in the Internet.

As an example, a user in Dallas may desire to log onto his bank's website, the server for which is located in Chicago. The access device divides the password into multiple segments and sends each segment to the authentication server in a different packet. Each packet is sent via a different one of the bank's servers. For example, a first packet may be sent to an intermediate server in Denver, while a second packet is sent to an intermediate server in Atlanta. A third packet may be sent to an intermediate server in St. Louis. Each of the intermediate servers may forward its received packet to another intermediate server or may send the packet directly to the authentication server in Chicago. Once again, a hacker attempting to capture the password from a router located between Dallas and Chicago will not be able to capture all of the password characters.

It should also be noted that when the inventive time delays of the present invention are used as a second or third password factor in embodiments in which the packets are forced to follow different paths, it is not possible for the hacker to determine the inter-packet timing, even if the hacker distributes his monitoring efforts and intercepts all of the password packets.

Figure 14:
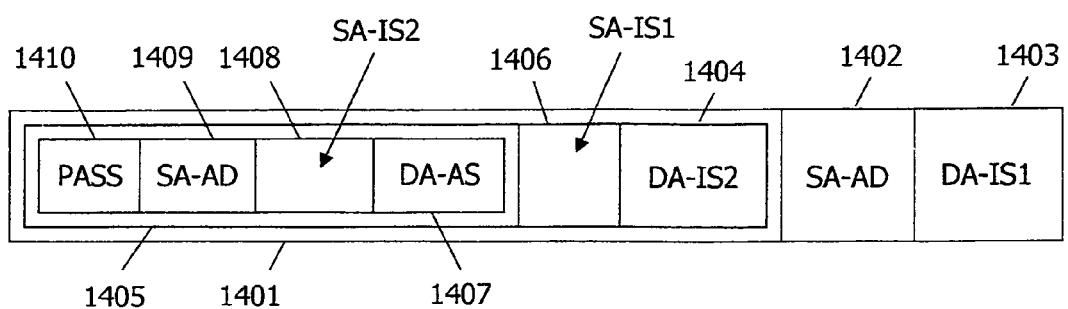
FIG. 14 illustrates a packet encapsulation method of implementing forced packet routing.

FIG. 14 illustrates a packet encapsulation method of implementing forced packet routing. In this embodiment, the access device again divides the password into multiple segments and sends each segment to the authentication server in a different packet. The packets are sent through intermediate servers or routers. In the example shown, a packet is sent through two intermediate servers, IS1 and IS2. The access device sends the password packet and a header for the second intermediate server within an outer encapsulation frame 1401. The outer encapsulation frame includes its own header comprising the source address for the access device (SA-AD) 1402 and the destination address for the first intermediate server (SA-IS1) 1403.

When the first intermediate server receives the outer encapsulation frame, the server strips off the header, revealing the destination address for the second intermediate server (DA-IS2) 1404 in a header for an inner encapsulation frame 1405. The first intermediate server adds its own source address (SA-IS1) 1406 to the header for the inner encapsulation frame and sends the frame to the second intermediate server. When the second intermediate server receives the inner encapsulation frame, the server strips off the header, revealing the destination address for the authentication server (DA-AS) 1407 in a header for the password packet. The second intermediate server adds its own source address (SA-IS2) 1408 to the header for the password packet and sends the packet to the authentication server. When the authentication server receives the packet, the server strips off the header, revealing the source address (or other identifier) of the access device 1409 and the password characters (PASS) 1410.

By encapsulating each of the password packets with the addresses of different intermediate servers or routers, the access device can control the path which each packet follows to the authentication server. Once again, if the packets follow different paths, a hacker monitoring a single router or path will not obtain all of the password characters. Also, when the inventive time delays of the present invention are used as a second or third password factor, it is not possible for the hacker to determine the inter-packet timing.

Figure 15:
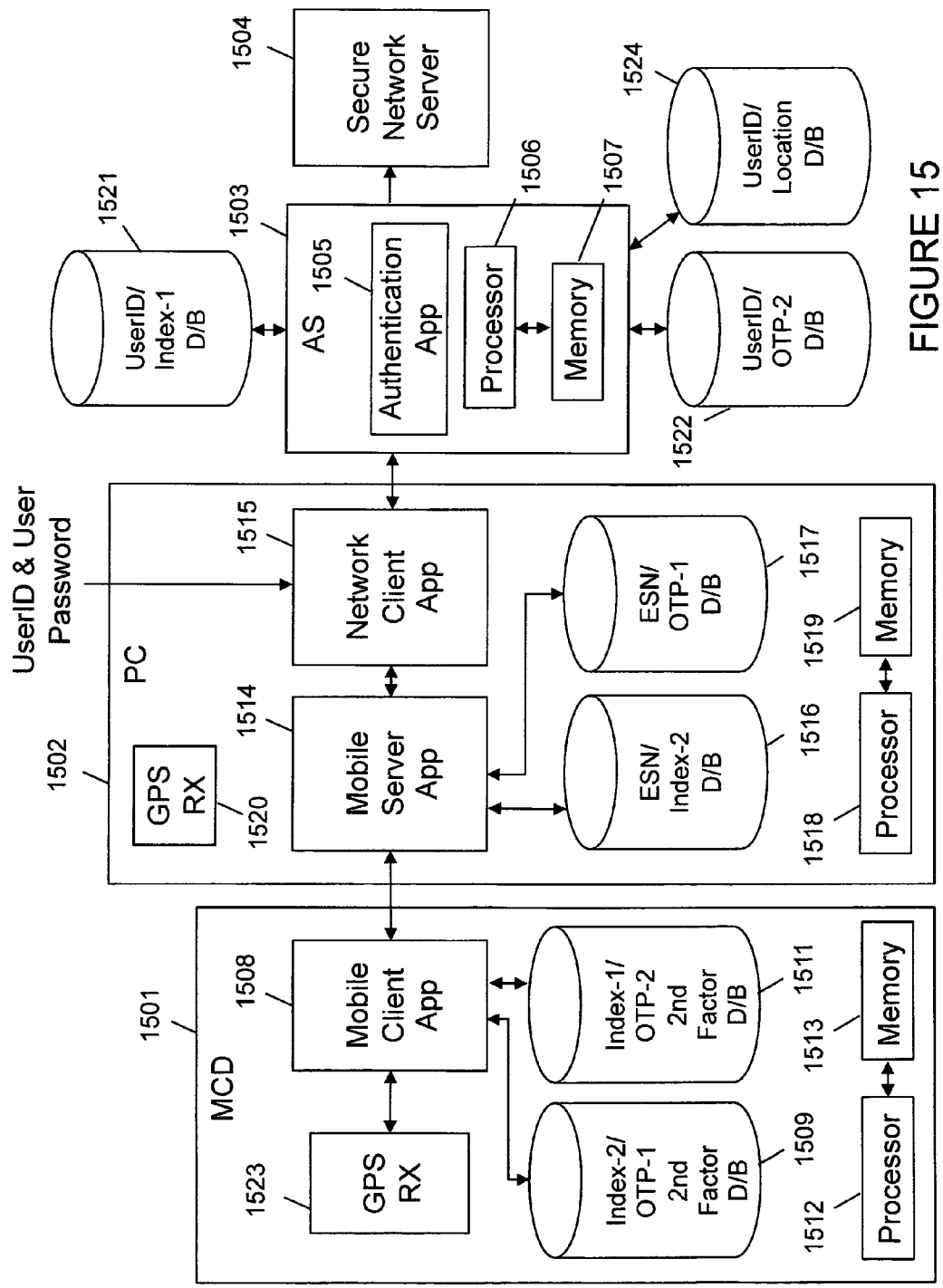
FIG. 15 is a functional block diagram illustrating the flow of information between system components when performing an exemplary secure logon method utilizing a Mobile Computing Device (MCD)

FIG. 15 is a functional block diagram illustrating the flow of information between system components when performing an exemplary secure logon method utilizing a Mobile Computing Device (MCD). In terms of industry recognized terminology, the user's User ID and password are "something that he knows", and his MCD (for example a mobile smartphone, Personal Digital Assistant (PDA), notebook or tablet computer, or the like) is "something that he has".

In this embodiment, the system includes an MCD 1501, a user computer 1502, an Authentication Server (AS) 1503, and a secure network server 1504. The user computer may be, for example, a desktop computer such as a Windows® PC, Apple iMac®, and the like, or may be a mobile computing device like the MCD. For example, the user computer may be a notebook or tablet computer, a PDA, another smartphone, and the like. The user computer may connect to the AS through a wired or wireless connection.

The AS 1503 is a processing device connected to the secure network server 1504, and it may include an Authentication Application 1505. The components of the AS included in the present invention may be implemented in hardware or in a combination of hardware and software in the form, for example, of a processor 1506 executing computer program instructions stored on a non-transitory memory 1507.

In the illustrated embodiment, the MCD includes a Mobile Client Application 1508 and two databases. An Index-2/OTP-1 second factor database 1509 associates an Index-2 value with stored second factors for constructing a mobile One-Time-Password (OTP-1) during the logon process. An Index-1/OTP-2 second factor database 1511 associates an Index-1 value with stored second factors to be utilized by the user computer to construct a network One-Time-Password (OTP-2) during the logon process. The MCD may also include a Global Positioning System (GPS) receiver (RX) 1523. The components of the MCD included in the present invention may also be implemented in hardware or in a combination of hardware and software in the form, for example, of a processor 1512 executing computer program instructions stored on a non-transitory memory 1513.

Two applications are installed on the user computer 1502: a Mobile Server Application 1514 and a Network Client Application 1515. The Mobile Server Application access two databases while conducting a logon process for the MCD 1501. An Electronic Serial Number (ESN)/Index-2 database 1516 associates MCD identifiers such as the ESN with stored Index-2 values, which vary for each access attempt. An ESN/OTP-1 database 1517 associates MCD identifiers such as the ESN with stored information enabling the Mobile Server Application to verify OTP-1 when it is received from the Mobile Client Application 1508 in the MCD 1501. The user computer may also include a GPS RX 1520. The components of the MCD included in the present invention may also be implemented in hardware or in a combination of hardware and software in the form, for example, of a processor 1518 executing computer program instructions stored on a non-transitory memory 1519.

Each of the databases in the MCD 1501 and the user computer 1502 may be stored in an "electronic vault". An electronic vault creates a safe haven area for storing, protecting, and sharing the most critical information. Desirable capabilities of the electronic vault include:

1. The protected database or password factors are protected within a secure file or folder that utilizes Advanced Encryption Standard (AES) 256 bit, Blowfish 448, or stronger secure encryption. Protected files are hidden, undeletable, inaccessible, and highly secure.

2. Protected folders are inaccessible to all users (including administrators). The vault hides and locks files, folders, and drives from all users including administrators.

3. A stealth mode hides the vault on the computer; only the user knows it is there.

4. Protected folders are not accessible from networked PCs.

5. The vault has automatic lock and automatic shutdown features.

6. Access is performed utilizing a secure ID/password.

Solutions for electronic vaults are commercially available from sources such as Gear Box Computers, Apple Inc., Microsoft Corporation, and others. The Gear Box vault may be utilized for Windows PCs. For Android, vaults from Open PGP or SecretVault Pro may be utilized.

The AS 1503 also accesses two databases, and optionally a third database, during the logon process. A User ID/Index-1 database 1521 associates User IDs with stored Index-1 values, which vary for each access attempt. A User ID/OTP-2 database 1522 associates User IDs with stored information enabling the AS to verify OTP-2 when it is received from the Network Client Application 1515 in the user computer 1502. An optional User ID/Location database 1524 associates User IDs with stored information for approved geographic locations for the user computer 1502.

Figure 16:
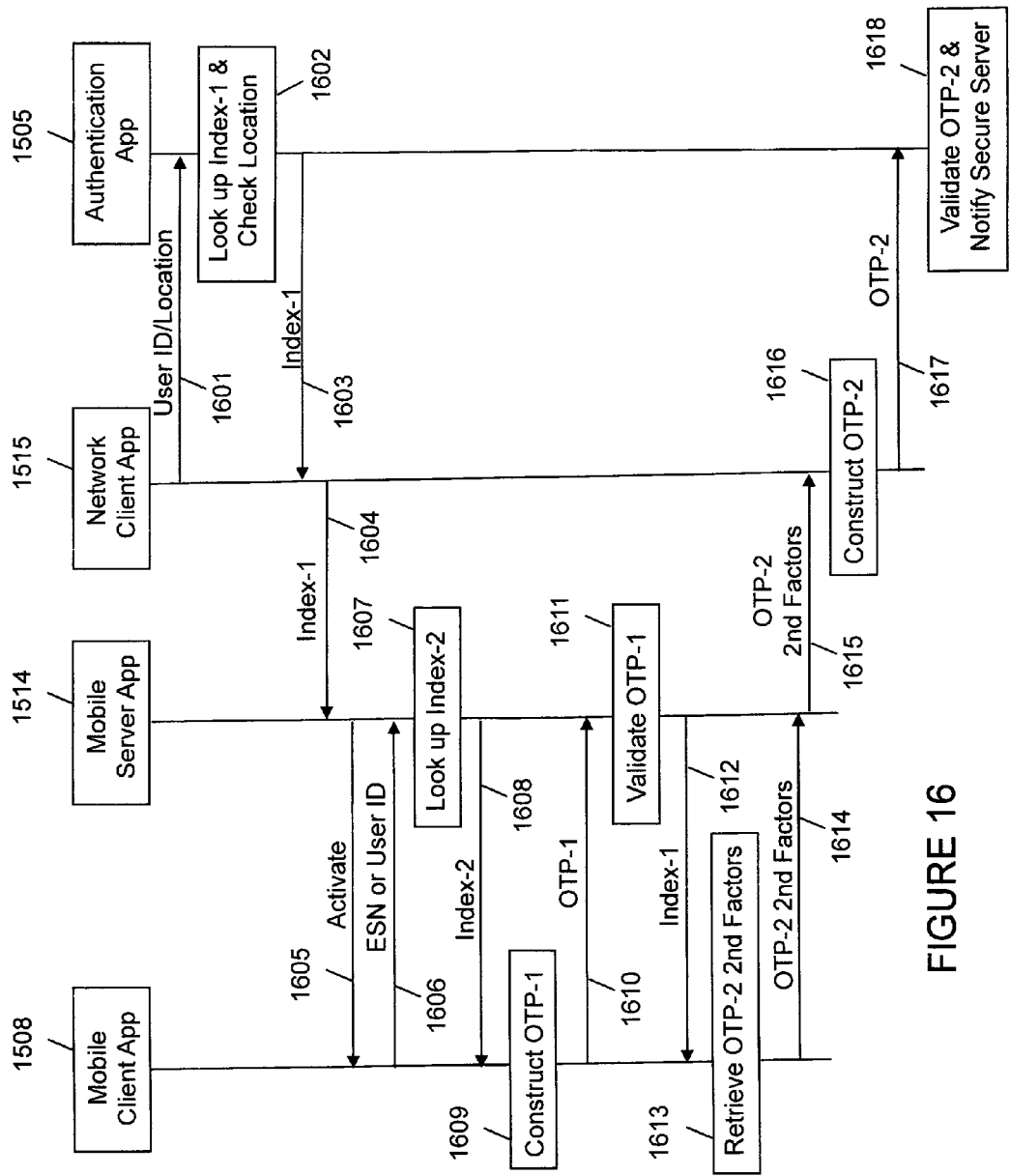
FIG. 16 is a message flow diagram illustrating the flow of information between the system components of FIG. 15 when performing a first exemplary embodiment of a secure logon method utilizing the MCD.

FIG. 16 is a message flow diagram illustrating the flow of information between the system components of FIG. 15 when performing a first exemplary embodiment of a secure logon method utilizing the MCD 1501. A precondition for the illustrated method is that a communication link has been established between the user computer 1502 and the MCD. The MCD may be linked to the user computer via, for example, a wireless connection, such as a Bluetooth® or WiFi connection, or with a cable such as a USB cable. If the link is a wireless link, the link may be established using standard Bluetooth® or WiFi procedures, and then the link may be encrypted using, for example, AES 128 or 256-bit encryption.

The link may be encrypted before or after an MCD authentication procedure described below is performed.

With reference to FIGS. 15 and 16, the method will now be described. As shown in FIG. 15, the user enters a User ID and password on the computer 1502, which passes the User ID and password to the Network Client Application 1515, and a logon dialog process begins. At step 1601, the Network Client Application on the user computer sends the User ID but not the password over the network to the Authentication Application 1505 in the AS 1503. The Authentication Application recognizes the User ID and at step 1602 uses it to access the User ID/Index-1 database 1521 and retrieve an associated index value, Index-1. At step 1603, the AS returns Index-1 to the Network Client Application on the user computer. At step 1604, the Network Client Application forwards Index-1 to the Mobile Server Application 1514 on the user computer, which triggers a logon dialog with the MCD 1501.

Optionally, the Network Client Application may also send location information for the user computer together with the User ID in step 1601. The location information may be, for example, the GPS location or a location associated with the user computer's allocated IP address. The Authentication Application recognizes the User ID and accesses the User ID/Location database 1524 to determine whether the reported location is an approved location for the user computer 1502. If so, the logon method continues. If not, the Authentication Application may end the logon attempt.

Steps 1605 through 1611 define an authentication process in which the Mobile Server Application 1514 on the user computer verifies that the Mobile Client Application 1508 on the MCD can properly construct and return the mobile One-Time-Password (OTP-1) based on an index value (Index-2) supplied by the Mobile Server Application. This ensures that it is, in fact, the user's MCD 1501 that is being used for the logon process, and not a clone.

At step 1605, the Mobile Server Application 1514 on the user computer sends an activation message to the Mobile Client Application 1508 on the MCD. In response, the Mobile Client Application sends an identifier at step 1606 to the Mobile Server Application on the user computer, wherein the identifier may be, for example, a device electronic serial number (ESN), a User ID loaded onto the MCD by the user, a network-assigned identifier, and the like. For simplicity, the description herein utilizes the ESN as the identifier. At step 1607, the Mobile Server Application accesses the ESN/Index-2 database 1516 and retrieves an associated index value, Index-2. At step 1608, the Mobile Server Application returns Index-2 to the Mobile Client Application on the MCD.

At step 1609, the Mobile Client Application 1508 accesses the Index-2/OTP-1 second factor database 1509 to retrieve factors for modifying, for example, the ESN of the MCD or the User ID stored by the user to construct OTP-1. At step 1610, the Mobile Client Application sends OTP-1 to the Mobile Server Application 1514 on the user computer. At step 1611, the Mobile Server Application accesses the ESN/OTP-1 database 1517 to retrieve information for verifying the OTP-1 received from the Mobile Client Application. When OTP-1 has been successfully verified, the MCD can be trusted.

Thus, at step 1612, the Mobile Server Application 1514 sends Index-1, which was received from the Authentication Application 1505 in the AS, to the Mobile Client Application 1508 on the MCD. In one embodiment, along with Index-1, the Mobile Server App 1514 sends a code or key for accessing the electronic vault in which the Index-1/OTP-2 second factor database 1511 is stored and protected. At step 1613, the Mobile Client Application 1508 accesses the Index-1/OTP-2 second factor database 1511 and retrieves a set of OTP-2 second factors. At step 1614, the Mobile Client Application sends the OTP-2 second factors to the Mobile Server Application 1514 on the user computer. At step 1615, the Mobile Server Application forwards the OTP-2 second factors to the Network Client Application 1515 on the user computer. At step 1616, the Network Client Application constructs OTP-2 by modifying the user's entered password with the OTP-2 second factors. At step 1617, the Network Client Application sends OTP-2 to the Authentication Application 1505 in the AS. At step 1618, the Authentication Application accesses the User ID/OTP-2 database 1522 to retrieve information for verifying the OTP-2 received from the Network Client Application. When OTP-2 has been successfully verified, the user computer 1502 can be trusted. Thus, the AS notifies the secure network server 1504 that the user computer 1502 is positively authenticated.

Figure 17:
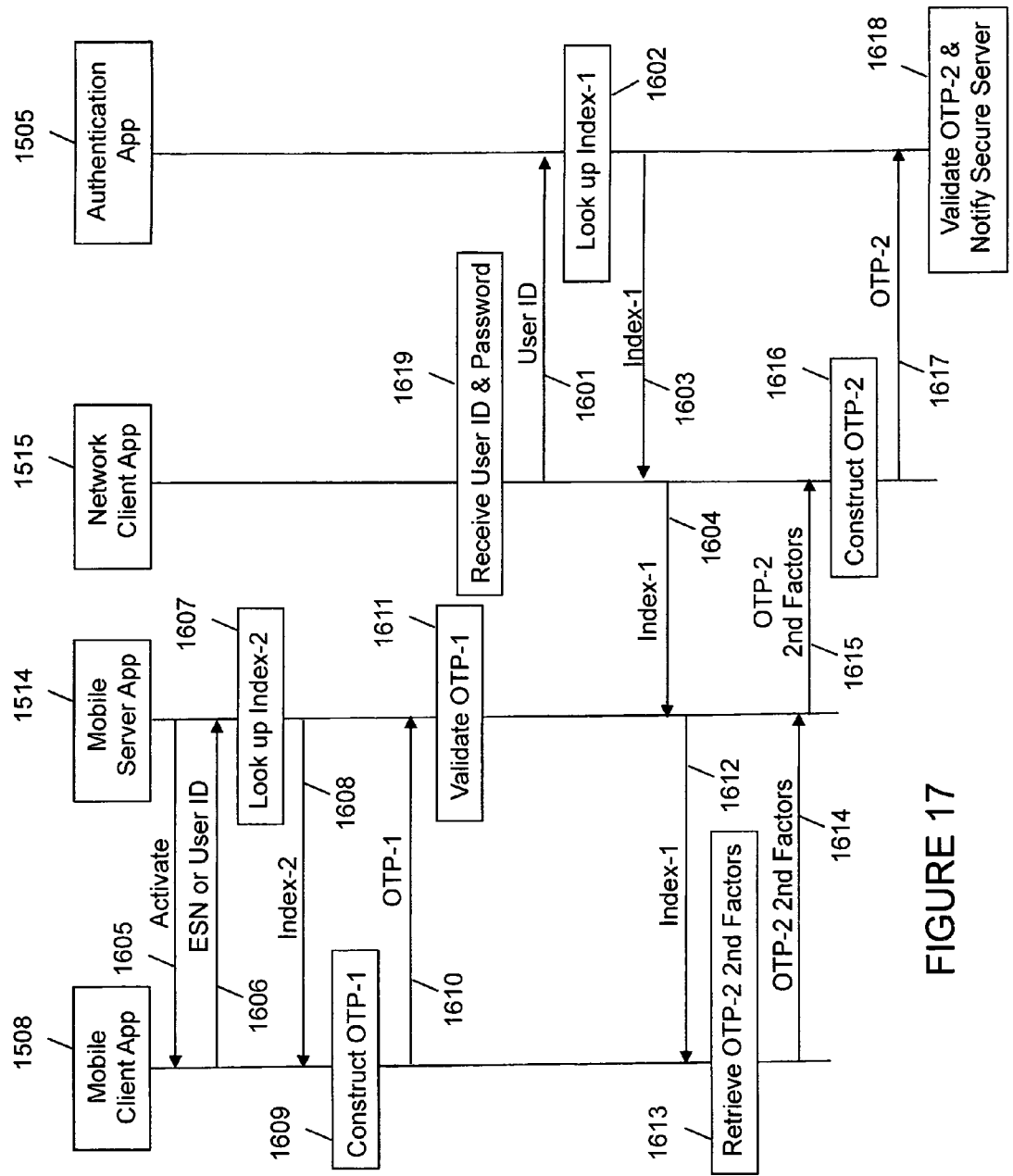
FIG. 17 is a message flow diagram illustrating the flow of information between the system components of FIG. 15 when performing a second exemplary embodiment of a secure logon method utilizing the MCD.

FIG. 17 is a message flow diagram illustrating the flow of information between the system components of FIG. 15 when performing a second exemplary embodiment of a secure logon method utilizing the MCD 1501. In this embodiment, the MCD 1501 may be pre-authenticated by the Mobile Server Application 1514, for example after initial establishment of the connection between the MCD and the user computer 1502. In this case, steps 1605 to 1611 may be conducted before the user enters the User ID and password. When the user enters the User ID and password at step 1619, the logon process performs steps 1601 to 1604, and then jumps to steps 1612 to 1618.

In further embodiments, the present invention may also utilize location information to perform an additional step for authenticating the MCD 1501. As an Internet-capable device, the MCD has an assigned IP address, which has an associated geographic location. Additionally, as noted above, the MCD may include the internal GPS receiver (RX) 1523, which independently generates location information. For such MCDs, the Mobile Server Application 1514 may request the GPS location from the MCD and compare it to the location associated with the MCD's IP address. If there is a mismatch in locations, the Mobile Server Application may deny access.

In another embodiment, the Mobile Server Application 1514 compares a location retrieved from the MCD 1501 with a location associated with the user computer 1502. Since both devices may have GPS receivers and both have IP addresses with associated geographic locations, it is possible to compare a number of different combinations. The IP address location or the GPS location from the MCD may be compared with the IP address location or the GPS location of the user computer. These locations should match within a reasonable distance since the MCD is connected to the user computer by either a cable or a short-range wireless link. The geographic locations associated with the IP addresses may vary to some degree, but if the locations are many miles apart, such as in a completely different city or country, then it is likely there some spoofing or cloning involved. In this case, the Mobile Server Application may deny access.

It is important to note that while the present invention has been described in the context of a fully functional computer system and network, those skilled in the art will appreciate that the instructions for practicing the method of the present invention are capable of being recorded on any type of a computer readable medium. The steps of the method of the present invention are executed, regardless of the particular type of signal-bearing media actually utilized. Examples of computer readable media include: nonvolatile, hard-coded type media such as read only memories (ROMs) or erasable, electrically programmable read only memories (EEPROMs), recordable type media such as floppy disks, hard disk drives, solid state drives, flash memory and CD-ROMs, and transmission type media such as digital and analog communication links.

It is thus believed that the operation and construction of the present invention will be apparent from the foregoing description. While the system and apparatus shown and described has been characterized as being preferred, it will be readily apparent that various changes and modifications could be made therein without departing from the scope of the invention as defined in the following claims.

What is claimed is:

1. A computer-implemented method of securely sending a network one-time-password (OTP) from a user computer to an authentication server, the method comprising the steps of:
   receiving through a user interface, a user password comprising a plurality of characters;
   authenticating by the user computer, a mobile computing device (MCD) communicably coupled to the user computer, wherein the authenticating step verifies that the MCD can properly construct and return to the user computer, a mobile OTP based on information provided by the user computer;
   receiving by the user computer, a network OTP second factor from the authenticated MCD;
   modifying by the user computer, the user password received through the user interface in accordance with the network OTP second factor to create the network OTP; and
   sending the network OTP from the user computer to the authentication server;
   wherein the user computer includes a mobile server application and the MCD includes a mobile client application, and the step of authenticating the MCD includes the steps of:
   the mobile server application receiving from the mobile client application, an identifier of the MCD;
   the mobile server application utilizing the identifier to look up an MCD index value (Index-2) in an identifier/Index-2 database in the user computer;
   the mobile server application sending the Index-2 value to the mobile client application;
   the mobile server application receiving a mobile OTP from the mobile client application, wherein the mobile client application constructs the mobile OTP based on a mobile OTP second factor retrieved from an Index-2/mobile OTP second factor database; and
   the mobile server application authenticating the MCD when the mobile OTP matches a stored mobile OTP in the user computer.

2. The method as recited in claim 1, wherein the MCD is assigned an Internet Protocol (IP) address having an associated geographic location, and the MCD also includes a Global Positioning System (GPS) receiver that independently generates GPS location information for the MCD, wherein the step of authenticating the MCD also includes the steps of:
   the mobile server application in the user computer receiving from the MCD, the GPS location information for the MCD and the IP address of the MCD;
   the mobile server application comparing the GPS location information with the geographic location associated with the IP address of the MCD; and
   the mobile server application positively authenticating the MCD only when the mobile OTP matches the stored mobile OTP in the user computer and the GPS location information matches the geographic location associated with the IP address of the MCD.

3. The method as recited in claim 1, wherein the step of the mobile server application receiving an identifier of the MCD from the mobile client application includes also receiving location information for the MCD, and the method further comprises:
   the mobile server application comparing the MCD location information with location information for the user computer; and
   the mobile server application positively authenticating the MCD only when the mobile OTP matches the stored mobile OTP in the user computer and the MCD location information matches the location information for the user computer.

4. The method as recited in claim 1, wherein the step of receiving the user password through the user interface includes receiving the user password and a User ID by a network client application in the user computer, and the method further comprises the steps of:
   the network client application sending the User ID to the authentication server;
   the network client application receiving a network index value (Index-1) from the authentication server, wherein the authentication server utilizes the User ID to look up the Index-1 value in a User ID/Index-1 database; and
   the network client application passing the Index-1 value to the mobile server application in the user computer.

5. The method as recited in claim 4, wherein the step of receiving by the user computer, the network OTP second factor from the authenticated MCD includes the steps of:
   the mobile server application sending the Index-1 value to the mobile client application in the MCD;
   the mobile server application receiving the network OTP second factor from the mobile client application, wherein the mobile client application utilizes the Index-1 value to retrieve the network OTP second factor from an Index-1/network OTP second factor database in the MCD; and
   the mobile server application passing the network OTP second factor to the network client application in the user computer.

6. The method as recited in claim 5, wherein the Index-1/network OTP second factor database is protected in an electronic vault in the MCD, and the step of sending the Index-1 value to the mobile client application includes the mobile server application also sending a code or key enabling the mobile client application to access the electronic vault.

7. The method as recited in claim 4, wherein the step of the network client application sending the User ID to the authentication server includes the network client application also sending location information for the user computer to the authentication server, wherein the authentication server positively authenticates the user computer only when the network OTP matches a stored network OTP in the authentication server and the user computer location information matches user computer location information stored in the authentication server.

8. The method as recited in claim 1, wherein the network OTP second factor includes at least one additional character to be added to the user password, and the step of modifying the user password received through the user interface in accordance with the network OTP second factor includes the steps of:
   the network client application dividing the password into a plurality of password segments and placing each segment in a different one of a plurality of data packets; and
   placing the additional character in an additional data packet; and wherein the step of sending the network OTP to the authentication server includes sending each of the data packets individually to the authentication server.

9. The method as recited in claim 1, wherein the network OTP second factor includes at least one additional character to be added to the user password, and the step of modifying the user password received through the user interface in accordance with the network OTP second factor includes the steps of:
the network client application dividing the password into a plurality of password segments and placing each segment in a different one of a plurality of data packets; and
placing the additional character in at least one of the data packets; and
wherein the step of sending the network OTP to the authentication server includes sending each of the data packets individually to the authentication server.

10. The method as recited in claim 1, wherein the network OTP second factor includes an inter-packet time interval, and the step of modifying the user password received through the user interface in accordance with the network OTP second factor includes:
the network client application dividing the password into a plurality of password segments and placing each segment in a different one of a plurality of data packets; and
wherein the step of sending the network OTP to the authentication server includes sending each of the data packets individually to the authentication server, wherein the data packets in at least one pair of data packets are separated by the inter-packet time interval.

11. The method as recited in claim 1, wherein the network OTP second factor includes a plurality of inter-packet time intervals, and the step of modifying the user password received through the user interface in accordance with the network OTP second factor includes:
the network client application dividing the password into a plurality of password segments and placing each segment in a different one of a plurality of data packets; and
wherein the step of sending the network OTP to the authentication server includes sending each of the data packets individually to the authentication server, wherein the data packets in each pair of data packets are separated by a different one of the plurality of inter-packet time intervals.

12. A computer-implemented method of authenticating a mobile computing device (MCD) by a user computer communicably coupled to the MCD, wherein the MCD includes a mobile client application and the user computer includes a mobile server application, the method comprising the steps of:
the mobile server application receiving from the mobile client application, an identifier of the MCD;
the mobile server application utilizing the identifier to look up an MCD index value (Index-2) in an identifier/Index-2 database in the user computer;
the mobile server application sending the Index-2 value to the mobile client application;
the mobile server application receiving a mobile one-time-password (OTP) from the mobile client application, wherein the mobile client application constructs the mobile OTP based on the MCD identifier and a mobile OTP second factor retrieved from an Index-2/mobile OTP second factor database; and
the mobile server application authenticating the MCD when the mobile OTP matches a stored mobile OTP in the user computer.

13. The method as recited in claim 12, wherein the MCD is assigned an Internet Protocol (IP) address having an associated geographic location, and the MCD also includes a Global Positioning System (GPS) receiver that independently generates GPS location information for the MCD, wherein the method further comprises the steps of:
the mobile server application in the user computer receiving from the MCD, the GPS location information for the MCD and the IP address of the MCD;
the mobile server application comparing the GPS location information with the geographic location associated with the IP address of the MCD; and
the mobile server application authenticating the MCD only when the mobile OTP matches the stored mobile OTP in the user computer and the GPS location information matches the geographic location associated with the IP address of the MCD.

14. An apparatus in a user computer for securely sending a network one-time-password (OTP) to an authentication server, the apparatus comprising:
a processor;
a non-transitory memory coupled to the processor, said memory storing computer program instructions, wherein when the processor executes the computer program instructions, the processor causes the apparatus to:
receive through a user interface, a user password comprising a plurality of characters;
authenticate a mobile computing device (MCD) communicably coupled to the user computer;
receive a network OTP second factor from the authenticated MCD;
modify the user password received through the user interface in accordance with the network OTP second factor to create the network OTP; and
send the network OTP to the authentication server;
wherein the user computer includes a mobile server application and the MCD includes a mobile client application, and the apparatus is configured to authenticate the MCD by performing the steps of:
the mobile server application receiving from the mobile client application, an identifier of the MCD;
the mobile server application utilizing the identifier to look up an MCD index value (Index-2) in an identifier/Index-2 database in the user computer;
the mobile server application sending the Index-2 value to the mobile client application;
the mobile server application receiving a mobile OTP from the mobile client application, wherein the mobile client application constructs the mobile OTP based on a mobile OTP second factor retrieved from an Index-2/mobile OTP second factor database; and
the mobile server application authenticating the MCD when the mobile OTP matches a stored mobile OTP in the user computer.

15. An apparatus in a mobile computing device (MCD) for securely sending a network one-time-password (OTP) second factor to a user computer communicably coupled to the MCD, the apparatus comprising:
a processor;
a non-transitory memory coupled to the processor, said memory storing computer program instructions, wherein when the processor executes the computer program instructions, the processor causes the apparatus to:
perform a procedure to authenticate the MCD with the user computer;
upon positively authenticating the MCD with the user computer, receive from the user computer, an Index-1 value;

utilize the Index-1 value to retrieve the network OTP second factor from an Index-1/network OTP second factor database in the MCD; and send the network OTP second factor to the user computer; wherein the user computer includes a mobile server application and the MCD includes a mobile client application and wherein when performing the procedure to authenticate the MCD, the processor causes the apparatus to:

send an identifier of the MCD to the mobile server application;

receive from the mobile server application, an MCD index value (Index-2) associated with the MCD identifier;

utilize the Index-2 to retrieve a mobile OTP second factor from an Index-2/mobile OTP second factor database;

construct a mobile OTP from the MCD identifier and the mobile OTP second factor: and send the mobile OTP to the mobile server application.

16. The apparatus as recited in claim 15, wherein the Index-1/network OTP second factor database is protected in an electronic vault in the MCD, and after performing the procedure to authenticate the MCD, the apparatus also receives from the mobile server application, a code or key enabling the mobile client application to access the electronic vault.

17. The apparatus as recited in claim 15, wherein the processor also causes the apparatus to establish an encrypted communication link with the user computer prior to performing the authentication procedure.

18. The apparatus as recited in claim 15, wherein the processor also causes the apparatus to establish an encrypted communication link with the user computer after performing the authentication procedure.

19. A computer program loaded on a non-transitory memory coupled to a processor of a user computer, wherein the program includes a mobile server application and a network client application, wherein when the applications are run on the processor, the processor causes the user computer to securely send a network one-time-password (OTP) to an authentication server by performing the following steps:

the network client application receiving through a user interface, a User ID and a user password comprising a plurality of characters;

the network client application sending only the User ID to the authentication server;

the network client application receiving from the authentication server, a first index value (Index-1), and passing the Index-1 to the mobile server application;

the mobile server application authenticating a mobile computing device (MCD) communicably coupled to the user computer;

the mobile server application sending the Index-1 to a mobile client application on the MCD;

the mobile server application receiving from the mobile client application, a network OTP second factor associated with the Index-1, and passing the network OTP second factor to the network client application;

the network client application modifying the user password received through the user interface in accordance with the network OTP second factor to create the network OTP; and the network client application sending the network OTP to the authentication server;

wherein the authenticating step includes:

the mobile server application sending an activation message to the mobile client application on the MCD;

the mobile server application receiving an MCD identifier from the mobile client application in response to the activation message;

the mobile server application retrieving from a database, a second index value (Index-2) associated with the MCD identifier;

the mobile server application sending the Index-2 to the mobile client application;

the mobile server application receiving from the mobile client application, a mobile OTP constructed from the MCD identifier and a mobile OTP second factor associated with the Index-2; and the mobile server application validating the mobile OTP.

20. The computer program as recited claim 19, wherein the Index-1/network OTP second factor database is protected in an electronic vault in the MCD, and after performing the procedure to authenticate the MCD, the processor also causes the mobile server application to send to the mobile client application, a code or key enabling the mobile client application to access the electronic vault.

* * * * *